United States Patent
Bragg et al.

(10) Patent No.: US 8,565,904 B2
(45) Date of Patent: Oct. 22, 2013

(54) IRRIGATION CONTROLLER AND SYSTEM INTEGRATING NO-WATERING RESTRICTIONS AND AN EMPIRICALLY-DERIVED EVAPOTRANSPIRATION LOCAL CHARACTERISTIC CURVE

(76) Inventors: Bruce Allen Bragg, Las Vegas, NV (US); Philip Andrew Kantor, Las Vegas, NV (US); Connie Ruby Masters, Henderson, NV (US)

( * ) Notice: Subject to any disclaimer, the term of this patent is extended or adjusted under 35 U.S.C. 154(b) by 0 days.

(21) Appl. No.: 13/080,201

(22) Filed: Apr. 5, 2011

(65) Prior Publication Data

US 2011/0270448 A1   Nov. 3, 2011

Related U.S. Application Data

(63) Continuation-in-part of application No. 12/755,337, filed on Apr. 6, 2010, now abandoned.

(51) Int. Cl.
| | | |
|---|---|---|
| G05B 11/32 | (2006.01) | |
| G05B 11/01 | (2006.01) | |
| G05D 11/00 | (2006.01) | |

(52) U.S. Cl.
USPC ............. 700/67; 700/18; 700/282; 700/284

(58) Field of Classification Search
USPC .......................................................... 700/67
See application file for complete search history.

(56) References Cited

U.S. PATENT DOCUMENTS

| | | | |
|---|---|---|---|
| 4,684,920 A | | 8/1987 | Reiter |
| 4,922,433 A | | 5/1990 | Mark |
| 5,208,855 A | * | 5/1993 | Marian ........................ 239/69 |
| 5,444,611 A | | 8/1995 | Woytowitz et al. |
| 5,479,339 A | * | 12/1995 | Miller ........................... 700/16 |
| 5,839,660 A | | 11/1998 | Morgenstern et al. |
| 5,870,302 A | * | 2/1999 | Oliver ........................... 700/11 |
| 6,102,061 A | * | 8/2000 | Addink ............................ 137/1 |
| 6,145,755 A | | 11/2000 | Feltz |
| 6,227,220 B1 | | 5/2001 | Addink |
| 6,298,285 B1 | * | 10/2001 | Addink et al. ............... 700/284 |
| 6,314,340 B1 | * | 11/2001 | Mecham et al. ............ 700/284 |
| 6,453,216 B1 | | 9/2002 | McCabe et al. |

(Continued)

OTHER PUBLICATIONS

Rain Bird ET Manager from www.irrisoft.net accessed on Sep. 5, 2008.

(Continued)

*Primary Examiner* — Elaine Gort
*Assistant Examiner* — Peter L Ludwig
(74) *Attorney, Agent, or Firm* — Connie R. Masters

(57) ABSTRACT

A convenient, easy-to-use, water-saving, and labor-saving FROG irrigation controller and system are provided, which determine the appropriate water budget and schedule for the property's landscaping based on evapotranspiration data for the geographic area, regulation data (mandated and voluntary watering restrictions), and property-specific data (such as type of plant, zone number, emitter type, and plant environment), with consideration given to reduction in watering days, increase in soil watering depth, and day of year. Once set, the FROG provides incremental adjustments over the course of the year; the homeowner no longer needs to re-set the watering program seasonally to comply with local mandated and voluntary watering restrictions. Compliance is automatic and obligatory, meeting the water saving goals of the local water authority. Optionally presented is a web-based wizard used to determine a customized water budget/schedule that is input into the FROG controller through a data storage unit or wireless input.

30 Claims, 12 Drawing Sheets

(56) References Cited

U.S. PATENT DOCUMENTS

| | | | |
|---|---|---|---|
| 6,714,134 B2 | 3/2004 | Addink et al. | |
| 6,782,311 B2* | 8/2004 | Barlow et al. | 700/284 |
| 6,823,239 B2* | 11/2004 | Sieminski | 700/284 |
| 6,892,113 B1 | 5/2005 | Addink et al. | |
| 6,892,114 B1 | 5/2005 | Addink et al. | |
| 6,895,987 B2 | 5/2005 | Addink et al. | |
| 7,010,395 B1 | 3/2006 | Goldberg et al. | |
| 7,010,396 B2 | 3/2006 | Ware et al. | |
| 7,048,204 B1 | 5/2006 | Addink et al. | |
| 7,058,478 B2 | 6/2006 | Alexanian | |
| 7,165,730 B2 | 1/2007 | Clark et al. | |
| 7,229,026 B2 | 6/2007 | Evelyn-Veere | |
| 7,257,465 B2 | 8/2007 | Perez et al. | |
| 7,266,428 B2 | 9/2007 | Alexanian | |
| 7,317,972 B2 | 1/2008 | Addink et al. | |
| 7,400,944 B2 | 7/2008 | Bailey et al. | |
| 7,403,840 B2 | 7/2008 | Moore et al. | |
| 7,412,303 B1* | 8/2008 | Porter et al. | 700/284 |
| 7,640,079 B2* | 12/2009 | Nickerson et al. | 700/284 |
| 7,853,363 B1 | 12/2010 | Porter et al. | |
| 7,877,168 B1 | 1/2011 | Porter et al. | |
| 2002/0014539 A1 | 2/2002 | Pagano | |
| 2002/0059005 A1* | 5/2002 | Sarver | 700/86 |
| 2004/0011880 A1 | 1/2004 | Addink et al. | |
| 2004/0089164 A1 | 5/2004 | Addink et al. | |
| 2004/0181315 A1* | 9/2004 | Cardinal et al. | 700/284 |
| 2004/0194833 A1 | 10/2004 | Townsend et al. | |
| 2005/0216128 A1 | 9/2005 | Clark et al. | |
| 2005/0273205 A1 | 12/2005 | Nickerson et al. | |
| 2006/0116792 A1 | 6/2006 | Addink | |
| 2006/0144213 A1 | 7/2006 | Mann | |
| 2006/0161309 A1* | 7/2006 | Moore et al. | 700/284 |
| 2007/0293990 A1* | 12/2007 | Alexanain | 700/284 |
| 2008/0111001 A1 | 5/2008 | Elmer | |
| 2008/0127063 A1* | 5/2008 | Silva et al. | 717/107 |
| 2008/0154437 A1 | 6/2008 | Alexanian | |
| 2009/0150002 A1 | 6/2009 | Fekete | |
| 2009/0204265 A1 | 8/2009 | Hackett | |
| 2009/0271045 A1* | 10/2009 | Savelle et al. | 700/284 |
| 2010/0030476 A1* | 2/2010 | Woytowitz et al. | 702/3 |
| 2011/0301767 A1* | 12/2011 | Alexanian | 700/284 |

OTHER PUBLICATIONS

Climate Computer Competition from www.climatecomputer.com accessed on Jan. 6, 2009.
Sylvan Addink, Tom W. Rodda. "Residential Landscape Irrigation Study using Aqua ET Controllers." Jun. 2002. from Aqua Conserve.
The Climate Computer from www.climatecomputer,com accessed Jan. 6, 2009.
Chapter 1—Introduction to Evapotranspiration from www.fao.org accessed on Feb. 22, 2008.
Mini-Clik Rain Sensors from www.hunterindustries.com accessed on Sep. 5, 2008.
WeatherTRAK from www.hydropoint.com accessed on Sep. 5, 2008.
International Search Report for WO2010118053.

* cited by examiner

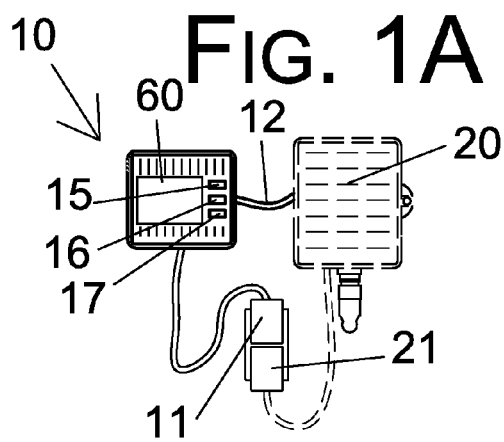
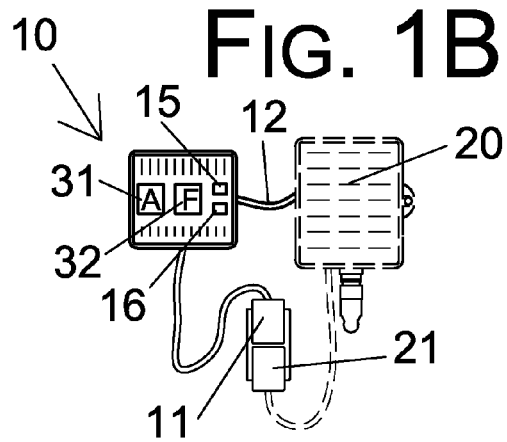
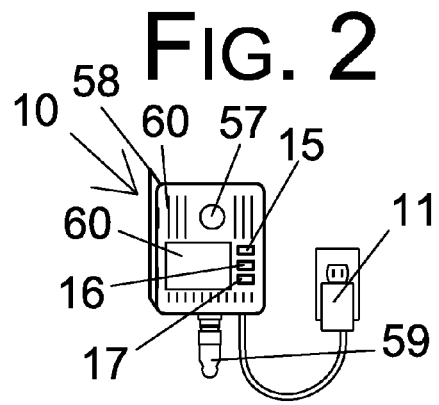
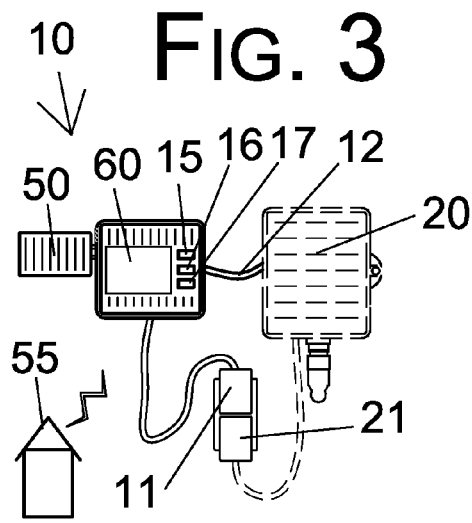
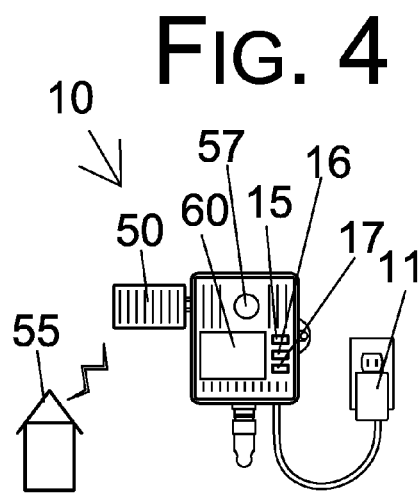

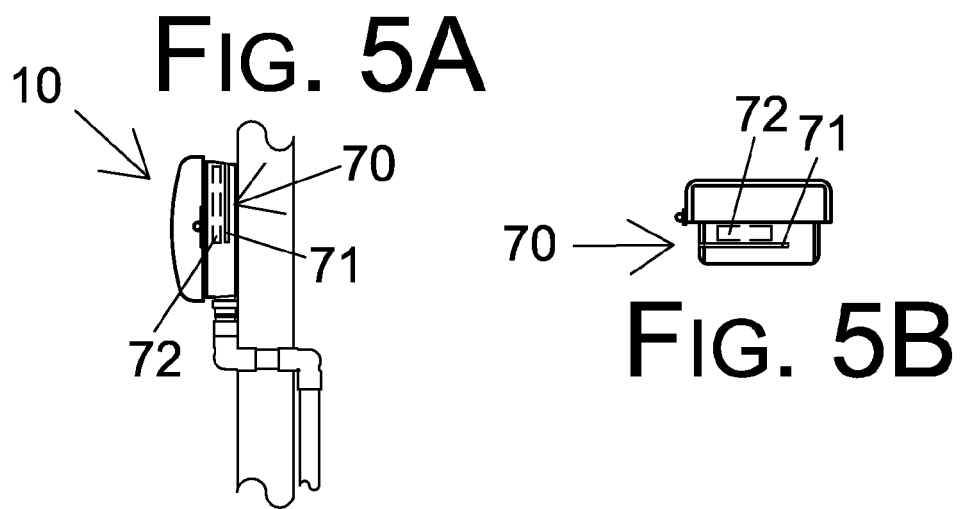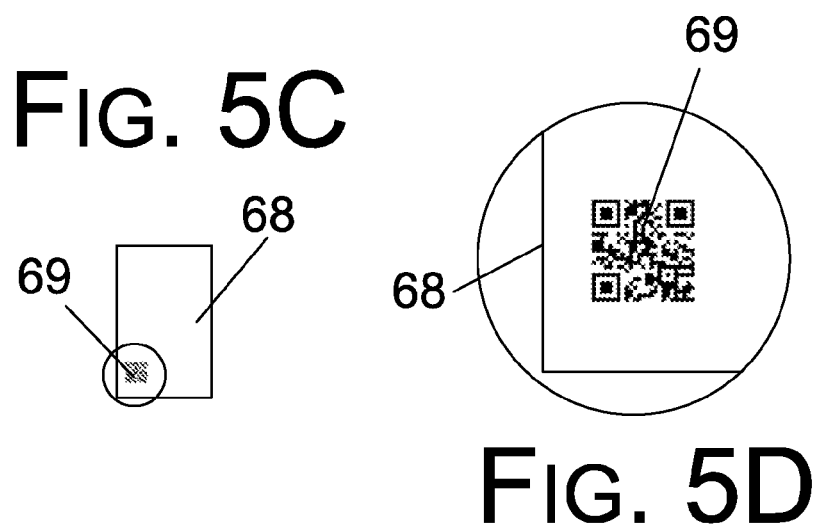

IRRIGATION CONTROLLER AND SYSTEM INTEGRATING NO-WATERING RESTRICTIONS AND AN EMPIRICALLY-DERIVED EVAPOTRANSPIRATION LOCAL CHARACTERISTIC CURVE

CROSS-REFERENCE TO RELATED APPLICATION

This Continuation-in-Part Application claims the benefit of U.S. patent application Ser. No. 12/755,337, filed on Apr. 6, 2010 now abandoned.

FIELD OF THE INVENTION

The present invention relates generally to an irrigation control system, and more particularly, to a controller (add-on or standalone) configurable using an empirically-derived evapotranspiration local characteristic curve and local mandatory and voluntary no-watering restrictions.

BACKGROUND INFORMATION

Irrigation controllers are commonly known in the prior art. They are electromechanical devices that control water delivery to a plurality of zones through the programmed opening and closing of water control valves, such as solenoid valves. For example, a residential landscape may be divided into eight separate watering zones. Some of the zones encompass turf requiring relatively more water delivered through sprayers. Some of the zones encompass bushes and trees requiring relatively less water delivered through bubblers and drip emitters. Homeowners or landscapers program the irrigation controller to deliver different amounts of water to these different zones by varying the amount of time the water control valves remain open in the course of a given irrigation cycle. For example, the valve covering Zone 1, a turf zone, may be programmed to be open five days per week ("watering days"), three times per day at specific times of the day ("start time") for ten minutes ("run-time duration"); the valve covering Zone 2, a bush and tree zone, may be programmed to be open only three days per week, three times per day immediately following the cycles of Zone 1, but with run-time durations of only five minutes; and so on and so forth.

A limitation of such existing irrigation controllers is that they must be manually reprogrammed to respond to seasonal changes, as well as to watering restrictions mandated by local water authorities ("mandated watering restrictions"). Ten minutes of water, three times per day may be appropriate for a turf zone in summer, but excessive for winter. Moreover, in summer, the irrigation controller may be programmed to water on any day of the week, but in winter, mandated watering restrictions may limit "allowed watering days" to just one day per week, with six days a week mandated as "mandated no watering days." To effect the changes needed to adjust for the seasons and mandated watering restrictions, homeowners and landscapers must manually reprogram the controller.

Because the foregoing changes are few in number—typically four times per year corresponding to the four seasons—and because conventional irrigation controllers are relatively easy to reprogram, implementing the required seasonal changes and mandated watering restrictions should be an acceptable burden. However, even if homeowners and landscapers faithfully reprogram their irrigation controllers these four times per year, this would still result in a substantial amount of water waste. Moreover, local water authorities find that their water conservation programs are far less effective than they should be due to the failure of homeowners and landscapers to comply with mandated watering restrictions, because even the few and simple steps needed to comply with them are too difficult for many homeowners and landscapers, or they simply do not implement them.

The water waste inherent in four-times-per-year reprogramming of conventional irrigation controllers is caused by the fact that the water demand of plants changes far more frequently than just four times per year. The water demand of plants is dictated by the rate at which plants lose moisture to evaporation, and the rate at which they are capable of replacing it ("evapotranspiration"). Evapotranspiration is influenced by many factors, including temperature, humidity, soil moisture, soil type, sun exposure, wind, type/amount of mulch, and, of course, plant type.

Some factors, such as plant type and sun exposure, are taken into account through the regular programming of a conventional irrigation controller. For example, a homeowner knows he has trees and shrubs, not turf, in Zone 2 of his yard, and that this portion of the yard is shaded from the sun. He takes this into account by watering Zone 2 with bubblers and drip emitters, rather than the sprayers used on turf zones. He also takes it into account by programming his conventional irrigation controller with start times and run-time durations that make sense for this plant type and for shade conditions (as well as soil type and other factors).

However, the homeowner cannot take evapotranspiration factors into account in this way. For example, temperature, humidity and wind fluctuate constantly, changing the water demand of plants constantly—and far more often than four times per year. Reprogramming an irrigation controller four times per year takes into account a range of these fluctuations. For example, in summer, temperatures in the Las Vegas Valley typically range between 80° F. and 115° F., versus winter when they may range between 35° F. and 65° F. The fact is, however, that these ranges are very broad. For example, an irrigation controller programmed to deliver water in accordance with the average anticipated temperature in the middle of the range may result in plant loss during hot, dry spells in midsummer, yet may deliver more water than is necessary at the beginning and end of the summer season. Thus, the current situation is detrimental to both homeowners (less than optimal water delivery) and the water authority (extra water use early and late in season).

With regard to mandated watering restrictions, some non-compliance is due to unwillingness of homeowners and landscapers to obey them. However, most non-compliance, according to local water authorities, is due to indifference or ignorance of the mandated watering days, despite local water authorities' best efforts to publicize them, or is due to confusion over when and where they apply. For example, different sections of a local water authority's jurisdiction may be assigned a watering group, such as "A" or "B." Homeowners in "A" may be assigned the allowed watering days Monday, Wednesday and Friday. Homeowners in "B" may be assigned the allowed watering days Tuesday, Thursday and Saturday. Thus, a homeowner must know whether he is in assigned watering group "A" or "B," and must additionally know the allowed watering days for that watering group—all of which changes four times per year. As simple as this may seem, it is apparently too much for a substantial percentage of homeowners and, to the extent homeowners rely on them, landscapers.

Industry has responded to the foregoing problems by creating what are known as "smart controllers." Following are examples of different approaches taken by smart controller developers.

One approach has been to make irrigation more scientific by benefiting from academic research on evapotranspiration. U.S. Pat. No. 5,208,855 issued to Marian discloses a smart controller outfitted with a receiver to pick up evapotranspiration data broadcast by weather stations and agricultural extensions. Such broadcasts consist of daily information for various localities about environmental factors such as temperature, humidity and wind. These data have been processed to determine their effect on evapotranspiration and, thus, water need for a reference crop, generally turf (determining what is known as reference evapotranspiration or "ETo"). Upon setting up the Marian smart controller, the user inputs locality and information about the type of plants he is irrigating, so that the smart controller may automatically pick up the broadcast ETo information corresponding to the user's locality, and calculate the water need of the user's plant matter as a percentage of ETo (based upon crop coefficients, which are published analyses of the evapotranspiration water needs of plant types as a percentage of the evapotranspiration water needs of the reference crop). Unfortunately, Marian's smart controller has numerous drawbacks for the average homeowner: (1) its emphasis on crop coefficients is suited to agriculture, not average homeowners, (2) the need for a receiver and relatively complicated data entry screen contribute to cost and complexity, and (3) the need for the homeowner to reset his irrigation controller seasonally is not removed. In the case of agriculture, these drawbacks are less important, because farmers are willing to, and do devote great attention to irrigation systems. Average homeowners do not, and a disruption to irrigation, for example, could subsist for days before a homeowner even noticed it. Additionally, Marian's smart controller does not facilitate the water authority's goal of increased compliance with mandatory watering restrictions.

U.S. Pat. No. 6,453,216 issued to McCabe et al. and U.S. Pat. No. 6,892,113 issued to Addink et al. disclose devices using historical evapotranspiration data as the means to determine a watering budget (McCabe et al.) or as part of the means to do so (Addink et al.). For example, historical evapotranspiration data may consist of an average of the evapotranspiration data for the same date over a multiyear period, e.g., December 1, for a specific location, e.g., Amarillo, Tex., for the three years 2000, 2001 and 2002. The advantage of using historical evapotranspiration data is that they free the user from needing to obtain current data, for example, by broadcast transmission, and entering current data into the smart controller. Instead, the historical data can be preloaded into the smart controller, enabling the smart controller to deliver water in accordance with the average historical evapotranspiration for that date and location. U.S. Pat. No. 6,314,340 issued to Mecham et al. discloses a device that measures high and low temperatures for the day, and then uses a specific formula, namely, the Hargreaves formula, to determine an appropriate watering budget. However, none of these patents address the problems of lack of compliance with mandated watering restrictions or with the troublesome requirement for the homeowner to reset the irrigation schedule of his irrigation controller each season to meet seasonal watering needs and/or seasonal mandated watering restrictions.

Another approach has been to create smart controllers capable of tracking one or more of the environmental factors affecting evapotranspiration rate, and increasing or decreasing water output in accordance with them. For example, U.S. Pat. No. 4,684,920 issued to Reiter and U.S. Pat. No. 4,922,433 issued to Mark focus on soil moisture. Using sensors placed in the ground throughout the area to be irrigated, these smart controllers benefit from real-time soil moisture readings in order to provide the right amount of irrigation. However, while these devices may be suitable for agricultural or commercial use (e.g., golf courses and shopping centers), they are not suitable for average homeowners, because the deployment and maintenance of soil sensors require too much effort and expense relative to homeowners' modest landscaping needs.

U.S. Pat. No. 6,892,114 issued to Addink et al., and U.S. Pat. No. 7,165,730 issued to Clark disclose smart controllers capable of measuring one or more environmental factors for the purpose of modifying the irrigation schedule of a conventional controller. However, both devices disclose suboptimal design, since they are not in series between an existing controller and the irrigation valves, but communicate only with the existing controller to modify an irrigation cycle, as discussed in greater detail below. U.S. Pat. No. 7,266,428 issued to Alexanian focuses solely on temperature as the predominant environmental factor affecting evaporation rate, and uses a non-standard evapotranspiration formula based solely on temperature to create water budgets.

U.S. Pat. No. 5,839,660 issued to Morgenstern et al. focuses primarily on precipitation and wind, disclosing a smart controller that measures these environmental factors and cuts off irrigation if either one exceeds a set value.

However, the smart controllers using environmental factors presented in these patents do not increase compliance with mandated watering restrictions nor decrease the work for the homeowner in resetting the irrigation controller at least seasonally.

Yet another approach has been to provide smart controllers giving users greater control over their irrigation systems. For example, U.S. Pat. No. 7,010,396 issued to Ware et al. covers an irrigation controller with an embedded Web server enabling the user to interact remotely and, hence, more frequently and conveniently with the controller. However, for the average homeowner, what is needed is not more involvement with the irrigation controller, but greater irrigation efficiency without more involvement.

Further, when adjusting the watering run-time duration or cutting off the irrigation, smart controllers of the prior art do not take into consideration the number of mandated no-watering days blocked out and the additional increased reduction in water delivery. For instance, in some regions in winter, there is only one allowed watering day per week, with six days of the seven mandated as no-watering days. If the irrigation is cut off on the one allowed watering day (such as due to an environmental factor), no irrigation will be given for two weeks. Similarly, as described in U.S. Patent Publication No. 2010/0030476 by Woytowitz et al., on the one allowed watering day, the watering run-time duration may be reduced by a relatively large percentage based on environmental factors through a seasonal adjust feature based on historical evapotranspiration rates, without accounting for the additional reduction forced by the six mandated no-watering days.

Unfortunately, no prior art device has effectively solved the problem of making irrigation efficiency more affordable and less burdensome for the average homeowner, while providing a simple means to implement local mandated watering restrictions, and thus promote the water-saving goals of the local water authority by increasing compliance. Smart controllers' complexity and expense, as well as their suboptimal design and methodology, have prevented them from penetrating this market that is crucial not only from a profit standpoint, but from a water and energy conservation standpoint.

(For example, pumping water to the Las Vegas Valley is the region's single greatest use of energy.)

SUMMARY OF THE INVENTION

The present invention, referred to here as the FROG smart irrigation controller, is directed to an easy-to-use, labor-saving irrigation controller that controls the start time and run-time duration of the irrigation valves based on a FROG watering schedule derived by using a FROG integration of (1) "evapotranspiration data" (including an "ETo_local" factor—the value of the ETo characteristic curve for a particular day in the particular geographic location—based on the empirically-derived evapotranspiration local characteristic curve setting forth the water need of the locally predominant variety of landscape material at different times of the year for the particular geographic area), (2) "regulation data" (including mandated watering restrictions applicable to the location [such as no-watering days, restricted-watering hours, assigned watering group] and including voluntary restrictions [such as an extra donated no-watering day incentivized by a water bill credit]), and (3) "property-specific data" (data relating to the specific landscape and watering system of the particular property, such as plant type, property-specific plant environment [e.g., sun/shade conditions, mulch type and amount, terrain, and soil type], number of valves/zones, emitter types, etc.). An example of this FROG integration is provided in the novel FROG algorithm based on total water volume, presented herein.

The FROG controller is presented herein as an add-on controller, as a standalone controller, and as an add-on controller convertible to a standalone controller; it can be initialized, updated, and/or reprogrammed using one or a combination of five presented methods of loading data into the controller: a preloaded mode, a learn mode (embodiment one, FIG. 1), a manual control input mode (embodiment two, FIG. 2) data input mode (embodiment four, FIG. 4, and embodiment five, FIG. 13-16), and a wireless input mode (embodiment five, FIG. 13-16). Additionally, the third embodiment of FIG. 3 presents sensor inputs that can optionally be used in the FROG integration.

Five exemplary embodiments that use the FROG integration and/or FROG algorithm of the current invention are presented. In the first embodiment (FIG. 1), the FROG is a simple add-on device in series between a conventional irrigation controller (the "existing controller") and irrigation valves. It receives property-specific data by utilizing the learn mode. As shown in FIG. 14, the evapotranspiration data and regulation data may be preloaded into the system before distribution of the FROG controller, or may optionally be input into the FROG controller by using the data storage input mode or wireless input mode of the fifth embodiment.

In the second embodiment (FIG. 2), the FROG is a comprehensive, standalone controller, allowing manual input of property-specific data by manipulation of the physical controls to set the start times and run-time durations for the multiple zones, as well as operating the irrigation valves, negating the need for a conventional controller. The evapotranspiration data and regulation data may be preloaded into the system before distribution of the FROG controller, or may optionally be input into the FROG controller by using the data storage input mode or wireless input mode of the fifth embodiment.

In the third embodiment (FIG. 3, FIG. 4), the FROG controller (either the add-on or standalone) receives sensor data from environmental sensors, and the water budget algorithm additionally utilizes these sensor data. The environmental sensors may be located within ("onboard") or near the FROG housing, or may be in a freestanding remote weather station (as shown). The sensors may be directly connected or wirelessly connected to the FROG. The one or more environmental sensors may measure temperature, humidity, solar radiation, rainfall, etc. When the sensor information is provided, the FROG algorithm is modified to additionally use the one or more received current environmental values, preferably after an environmental-factor averaging calculation is performed.

In the fourth embodiment (FIG. 5 to FIG. 7), a data input system is provided, which may be utilized with any of the other presented embodiments.

The fifth embodiment (FIG. 13 to FIG. 16) illustrates using an SD card as a data storage unit. The fifth embodiment can optionally also be configured to utilize the wireless input mode using a standard wireless network to receive data.

Multiple methods of initializing, configuring and updating the FROG are presented, including a learn mode, a manual control mode, a data storage unit input mode, and a wireless input mode. These modes can be used alone or in combination. In the learn mode method, the FROG automatically "learns" the programmed watering schedule ("initial watering schedule") including the start times ("initial start times") and run-time durations ("initial run-time durations") of the existing controller in a "learn mode." In the manual control mode the homeowner can use physical buttons and dials to input data. (The term "homeowner" or FROG controller "user" can refer to the owner or renter of the home, the landscaper, the irrigation installer, a business owner, or other person authorized to install, update or re-program the FROG controller.) In the data storage unit input method and wireless input method, data can be input through use of a data storage unit inserted into the FROG controller or wirelessly, either by the water authority or by the user after accessing a website server and using a customization wizard to input property-specific data. The user defines and characterizes the plant information (type, environment, terrain, amount of sun, etc.) along with the irrigation system information (number of valves, types of emitters, etc.). The FROG water budget algorithm creates the water budget and schedule customized to meet the user's landscaping needs. This customized water budget and schedule is transferred to the FROG controller by use of a physical data storage unit or a wireless transmission; this may be either to initialize or to update the FROG controller. After initializing, the FROG takes over the scheduling of irrigation and operation of the irrigation valves, implementing the FROG watering schedule. The FROG controller then controls the valves of the irrigation system to implement the FROG customized water budget.

In another aspect, the FROG smart controller is also designed with a user-donated (and preferably user-selectable) "float" day, which is a "voluntary no-watering day." In exchange for a credit applied to the homeowner's water bill, the homeowner may designate one additional day as a voluntary no-watering day. Thus the water saving goals of the water authority are furthered.

An object of the present invention is to provide a FROG smart controller that implements mandatory watering restrictions, thus insuring compliance and saving water.

A further object of the present invention is to provide a FROG smart controller that is easy to operate and convenient for the user.

An additional object of the present invention is to provide a FROG smart controller that provides incremental adjustments of the water budget, as opposed to merely seasonal adjustments.

Another object of the present invention is to provide a FROG smart controller that delivers a customized water budget (the appropriate amount of water to meet the need of the landscape plants at different times of the year for the particular property or location, while taking into consideration local water authority regulations).

These and other objects, features, and advantages of the present invention will become more readily apparent from the attached drawings and from the detailed description of the preferred embodiments, which follow.

BRIEF DESCRIPTION OF THE DRAWINGS

The preferred embodiments of the invention will hereinafter be described in conjunction with the appended drawings, provided to illustrate and not to limit the invention, where like designations denote like elements, and in which:

FIG. 1A depicts a front view of the FROG add-on controller of the first embodiment of the present invention having a graphic display and being connected to an existing conventional irrigation controller;

FIG. 1B depicts a front view of the FROG add-on controller of the first embodiment of the present invention having a simplified user-interface without a graphic display screen and being connected to an existing conventional irrigation controller;

FIG. 2 depicts a front view of the FROG standalone controller with manual controls of the second embodiment of the present invention;

FIG. 3 depicts a front view of a sensor module attached to the FROG add-on controller of the third embodiment of the present invention, wherein the FROG add-on controller is in communication with a weather station housing one or more environmental sensors and is connected to an existing conventional irrigation controller;

FIG. 4 depicts a front view of a FROG standalone controller of the fourth embodiment of the present invention, wherein the FROG comprehensive controller is in communication with one or more environmental sensors;

FIG. 5A depicts a side view of the FROG controller of the fourth embodiment of the present invention configured with the data input system embodied as a reader slot and optical reader;

FIG. 5B depicts a top view of the FROG controller of the fourth embodiment of the present invention configured with a data input system embodied as a reader slot and optical reader;

FIG. 5C depicts a front view of an insertable sheet imprinted with a QR Code®-type optical code (such as could be printed on a customer's bill) for inserting into the reader slot of the data input system;

FIG. 5D depicts a detail of the circle of FIG. 5C showing the QR Code®-type optical code readable by the optical reader;

Like reference numerals refer to like parts throughout the several views of the drawings.

DETAILED DESCRIPTION OF THE PREFERRED EMBODIMENTS

Shown throughout the figures, the present invention is directed toward a FROG smart controller 10 that improves the efficiency of irrigation scheduling and saves water through use of a FROG integration of evapotranspiration data and regulation data applied to property-specific data. Consequently, the FROG controller 10 provides advantages for both the homeowner (convenience, labor reduction, improved water delivery correlated to day of year) and the local water authority (obligatory compliance with mandated watering restrictions). An important strategy in reaching the water saving goals of the local water authority is met through the hard-to-achieve increased compliance resulting from use of the FROG irrigation control system.

Figure 8:
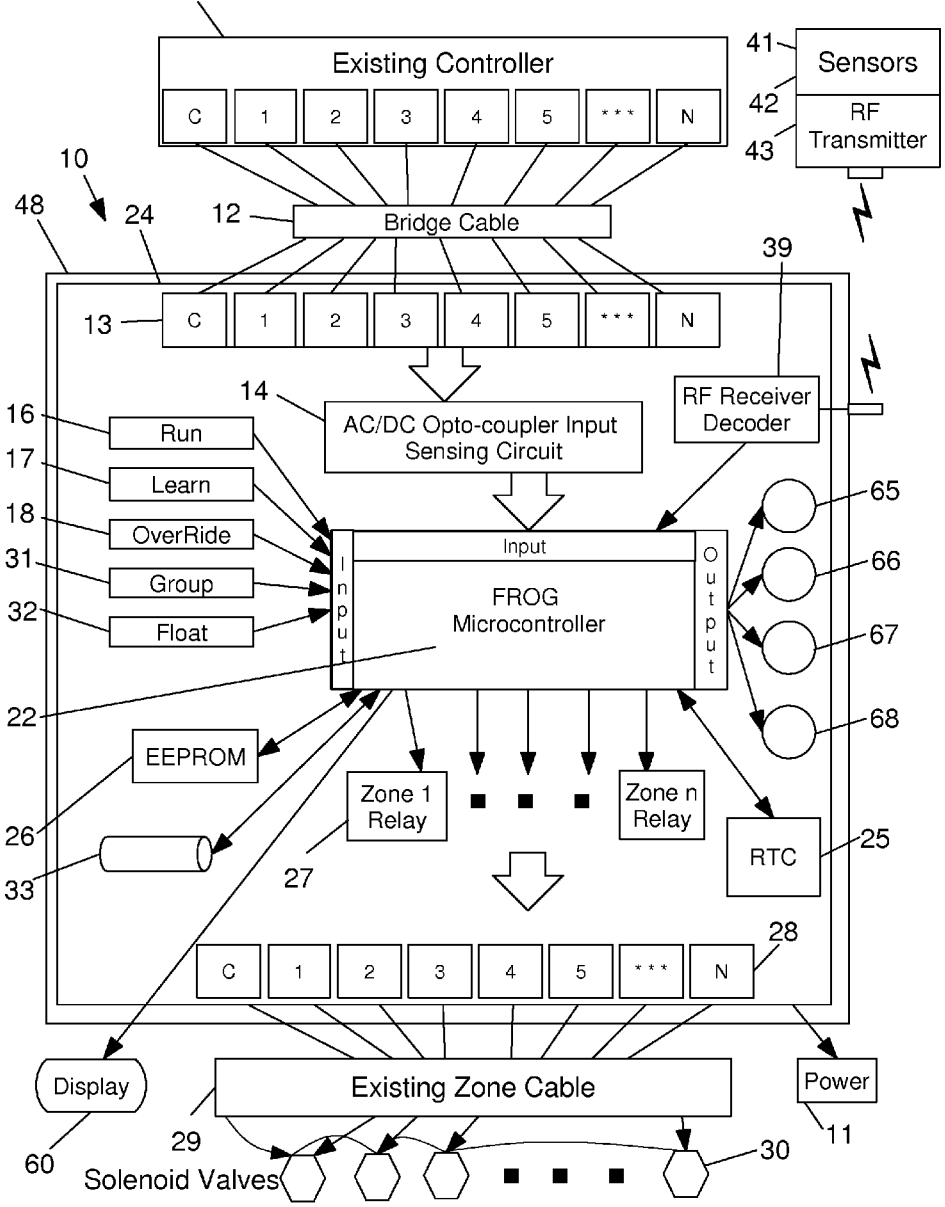
FIG. 8 depicts a schematic of the add-on FROG smart controller of the first embodiment. The installed existing controller 20 is wired zone-by-zone through bridge cable 12 to the main control unit of the FROG controller 10.

As opposed to the conventional automatic controllers for in-ground irrigation systems that the homeowner must reset four times a year to meet the seasonal watering need changes and the seasonal changes in local water authority mandated watering restrictions, the homeowner initially sets the FROG controller 10 and then forgets it, with no further effort required (except the suggested periodic replacement of the back-up battery 33, FIG. 8).

Additionally, as opposed to conventional controllers that generally water for an entire season based on a single setting, the "FROG algorithm" (the mathematical application of the FROG integration) provides an incremental adjustment based on the actual day of the year or on a few days surrounding the watering day by using the ETo_local characteristic curve for the location. A conventional controller set in April for an April to June season will deliver more water than is needed in April and/or less water than is needed in June. The FROG controller 10, once initially set (or reset) with the customized water budget/schedule 105 (FIG. 15) determined by the FROG algorithm, will deliver water corresponding to the local watering needs incrementally adjusted in correlation with the watering day.

Also, in contrast to conventional controllers, consideration is given to the number of mandated and optionally voluntary no-watering days by the FROG algorithm, so the plants receive adequate water even when the number of allowed watering days is greatly reduced. The novel FROG algorithm additionally incorporates a compensation coefficient S and a watering depth factor W to further refine the total volume of water delivered. (The water volume is not a flow meter-measured volume, but is a quantity related to the flow rate, run-time duration, number of start times, number of days watered.)

The FROG integration may be advantageously used with a number of types and configurations of irrigation control systems. Five exemplary embodiments (with additional aspects and variations) utilizing the FROG integration are demonstrated to illustrate the general usability of the FROG integration and algorithm with these and other configurations.

EMBODIMENTS OVERVIEW

The first embodiment of FIG. 1A, FIG. 1B presents the FROG controller as an add-on controller for connection to an existing conventional irrigation controller 20. FIG. 1 includes a graphic display, while an economical, simplified user interface without a graphic display is presented in FIG. 1B. Learn mode FIG. 12, 14 methods are presented, allowing the add-on FROG controller 10 to learn the start times and run-time durations for the various zones of the existing controller 20.

The second embodiment of FIG. 2 presents the FROG as a comprehensive standalone controller applying the FROG integration and/or FROG algorithm to the watering schedule as in the first embodiment, but additionally configured to allow a user to manually input the necessary portion of the property-specific data (such as program start times, watering days, and run-time durations for the various zones), thereby removing the need for the conventional controller 20.

Figure 9:
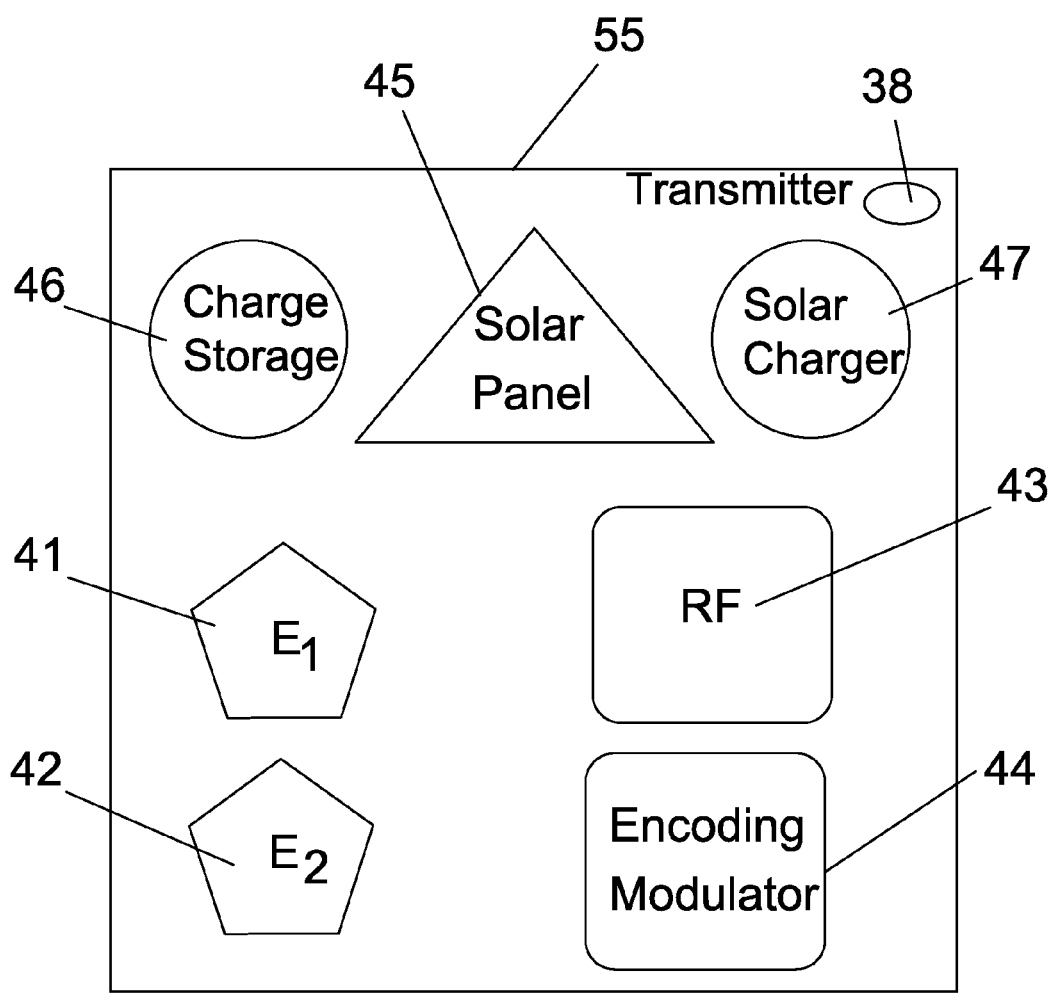
FIG. 9 depicts a schematic of the remote weather station 40 of the third embodiment.

The third embodiment of FIG. 3, FIG. 4, and FIG. 9 presents either the add-on or the standalone FROG controller in communication with one or more environmental sensors 41, 42.

The fourth embodiment (FIG. 5A, FIG. 5B, FIG. 5C, FIG. 5D, FIG. 6A, FIG. 6B, FIG. 6C, FIG. 7A, FIG. 7B, and FIG. 7C) presents an optional data input system 70 for use with either the add-on or standalone FROG controller; variations of the data input system are also presented.

The fifth preferred embodiment (FIG. 13, FIG. 14, FIG. 15, FIG. 16) presents both the data storage unit input method (with the data input system using an SD card for input) and the wireless input method (utilizing a standard wireless network transmission system). The data storage unit input method and the wireless input mode may each be used alone or in combination.

Figure 14:
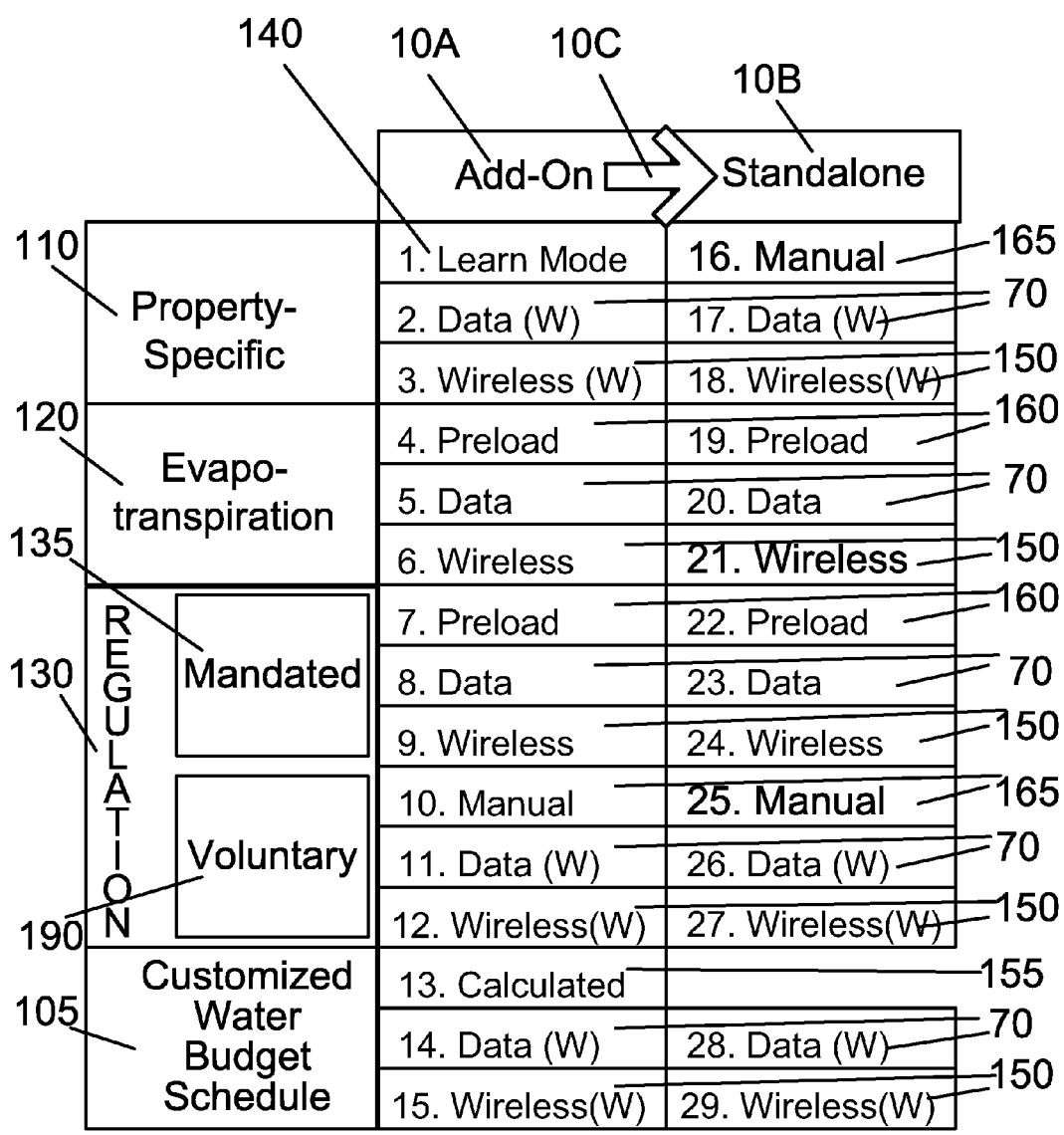
FIG. 14 depicts methods of inputting data for the add-on, the convertible, and the standalone FROG controller. The data that can be input includes: property-specific data, evapotranspiration data, regulation data (voluntary and water authority restrictions), and the customized water budget/schedule 105 for the homeowner's landscape.

The FROG irrigation controller 10 is targeted toward only a few geographical locations at a time, and, preferably, just one, such as the Las Vegas Valley. It may be programmed for only the one designated geographic location in which it will be used, with only the ETo_local and mandated watering restrictions (such as no-watering days and/or no-watering hours of the day and/or the watering days corresponding to each assigned watering group and the like) of that designated geographic location loaded. (The term "loaded" refers to storing data, such as regulation data, evapotranspiration data, property-specific data, and/or a customized water budget/schedule 105 (FIG. 15) on a storage medium 26 of the FROG irrigation controller 10, such as by the manufacturer, distributor or intermediary before installation, or when the installer or homeowner uses the data input system 70, or when the wireless system 150, FIG. 14, provides the data to be stored.) If only loaded with one designated geographic location, the designated geographic location is not selectable by the user and complexity is reduced. Optionally, it may be loaded with the ETo_local and mandated watering restrictions of multiple geographic locations, with the geographic location to be designated by the installer or user (such as by the use of the basic, manual control devices or data input system 70).

First Embodiment

Add-On Controller

Referring now to the first embodiment of FIG. 1, an add-on FROG controller 10 is designed to work with an installed existing controller 20 that has been user-programmed to take into account the appropriate watering needs of the plant types predominating in each individual irrigation zone of the user's landscape. For example, a zone comprising predominately turf may deploy sprayers scheduled to run on several days at several times per day for relatively long run-time durations; a zone comprising predominately trees and shrubs may deploy bubblers and drip emitters scheduled to run on fewer days at fewer times per day for relatively short run-time durations. Further, zones that are relatively shaded may be scheduled for start times and run-time durations reflecting a different and lower watering need due to the shaded conditions.

The add-on FROG controller 10 is in communication with existing irrigation controller 20, connected to the existing controller 20 by bridge cable 12. The add-on FROG controller 10 can use the learn mode to receive the property-specific data, as described in FIG. 12. When using the learn mode to input the property-specific data, the existing controller 20 may optimally be programmed to provide the full amount of water needed for each zone under the hottest and driest anticipated conditions of the year. This is because, in this embodiment, the FROG will cut back water output as determined by the FROG integration and/or FROG algorithm based on ETo_local and watering restrictions, but does not boost water output beyond what has been programmed into the existing controller 20.

Add-On Frog Controller Components And Wiring

As shown in FIG. 8, the "main control unit" 24 of the add-on FROG controller 10 is enclosed in housing 48 and is wired to the existing controller 20, with the FROG controller 10 preferably in physical proximity to the existing controller 20 to minimize the amount of bridge cable 12 required. Housing 48 may be designed for indoor use or may comprise an all-weather enclosure to enable close physical proximity to the existing controller 20, even if the existing controller 20 is in an exterior location.

The main control unit 24 comprises several groups of features, including: (1) an existing-controller input system configured to allow main control unit 24 to communicate with the existing controller, such as an input terminal strip 13, connecting to the AC/DC opto-coupler input sensing circuits 14, connecting in turn to a microcontroller 22; (2) at least one non-volatile memory, storage medium 26, such as EEPROM (Electronically Erasable Programmable Read-Only Memory), and real-time clock 25; (3) microcontroller 22 and associated circuitry; and (4) a microcontroller water-valve regulation system configured to allow the microcontroller to control the water control valves 30, such as by connecting the microcontroller outputs to a zone relay bank 27, connecting to the output terminal strip 28, which is in turn wired to existing zone cable 29 regulating water control valves 30.

Before undertaking to wire the main control unit 24 of the add-on FROG controller 10 to the existing controller 20, the user preferably marks or makes note of the existing controller's zone cable 29 wiring scheme, e.g., red wire connects Zone 2; black wire connects Common (C); etc. The cable is then removed. The bridge cable 12 of the main control unit 24 is then connected to the existing controller 20, as annotated, which is to say that Zone 1 of the main control unit is connected to Zone 1 of the existing controller 20; the Common of the main control unit is connected to the Common of the existing controller 20; etc. To the extent the main control unit 24 has more available zone wires than the existing controller 20 has active zones, such extra zone wires are ignored and may be terminated.

Next, the main control unit 24 is connected to the irrigation valves 30 by reconnecting the existing zone cable 29 to the main control unit zone output terminals 28, taking care to correlate the zone and Common designations marked or noted during the removal process as explained above.

In an aspect, the main control unit 24 has its own power supply 11 (FIG. 1, FIG. 8, which may include a plug-in transformer), and is separately plugged into an electrical outlet. By not drawing power from the existing controller 20 as provided in prior art devices, the FROG controller 10 does not risk causing the existing controller 20 to exceed its power supply power rating. Optionally, though, in some configurations, the FROG controller 10 may draw power from an existing controller 20.

The FROG controller's processing power may be supplied by a conventional microcontroller or microprocessor (the "microcontroller") 22 (such as a RISC-based microcontroller based on the Harvard architecture or other microcontroller means currently available or as may be developed in the future) in conjunction with a real-time clock (the "RTC") 25 and at least one non-volatile memory, storage medium 26, for storing static data (such as EEPROM, RAM, or other memory storage means currently available or as may be developed in the future). The microcontroller 22 may be preprogrammed with a supervisory program that manages all components, circuits, program logic, inputs, outputs, and control (the "microcontroller program"), but at least the microcontroller 22 is preprogrammed with a kernel program to provide minimal functionality sufficient to receive the full "microcontroller program." The microcontroller program is responsible for monitoring, managing and controlling the overall operation of the FROG.

The main control unit 24 may be outfitted with one or more manual control devices 15, 16, 17, 18, 19, 31, 32 (such as a rotary switch, push button, or digital control), which may be indicated by an indicator device 65 (such as an LED, or other means, audible and/or visual). A manual control device 15, 16, 17, 18, 19, 31, 32 can be used to input data or initiate events, digitally or mechanically. One or more of the manual control devices can be used to input data or to make selections and interface with the graphic display screen 60. For example, in response to displayed outputs on the display screen 60, the user can input the applicable watering group 31 (FIG. 8) as assigned by the local water authority, to adjust the float day 32, to initiate learn mode 17, to initiate run mode 16, or to override 18 the FROG controller. Once the input is received, it may be stored in the storage medium 26.

In one aspect, illustrated in FIG. 1B, a simple FROG controller without a graphic display is presented. Four manual control devices are illustrated, a learn mode input 17, a run mode input 16, a mandated watering group (as assigned by the local water authority) designation input 31, and a float day input 32.

In another aspect, illustrated in FIG. 1A, the FROG controller 10 is configured with a graphic display 60 viewable to the user and operable to display useful information, such as displaying requests for specific user input, values input by the user, and error messages. Optionally, the graphic display screen 60 may be a touch screen allowing direct manual control through touching the screen to make presented selections.

Add-On Frog Controller—Learn Mode

Figure 12:
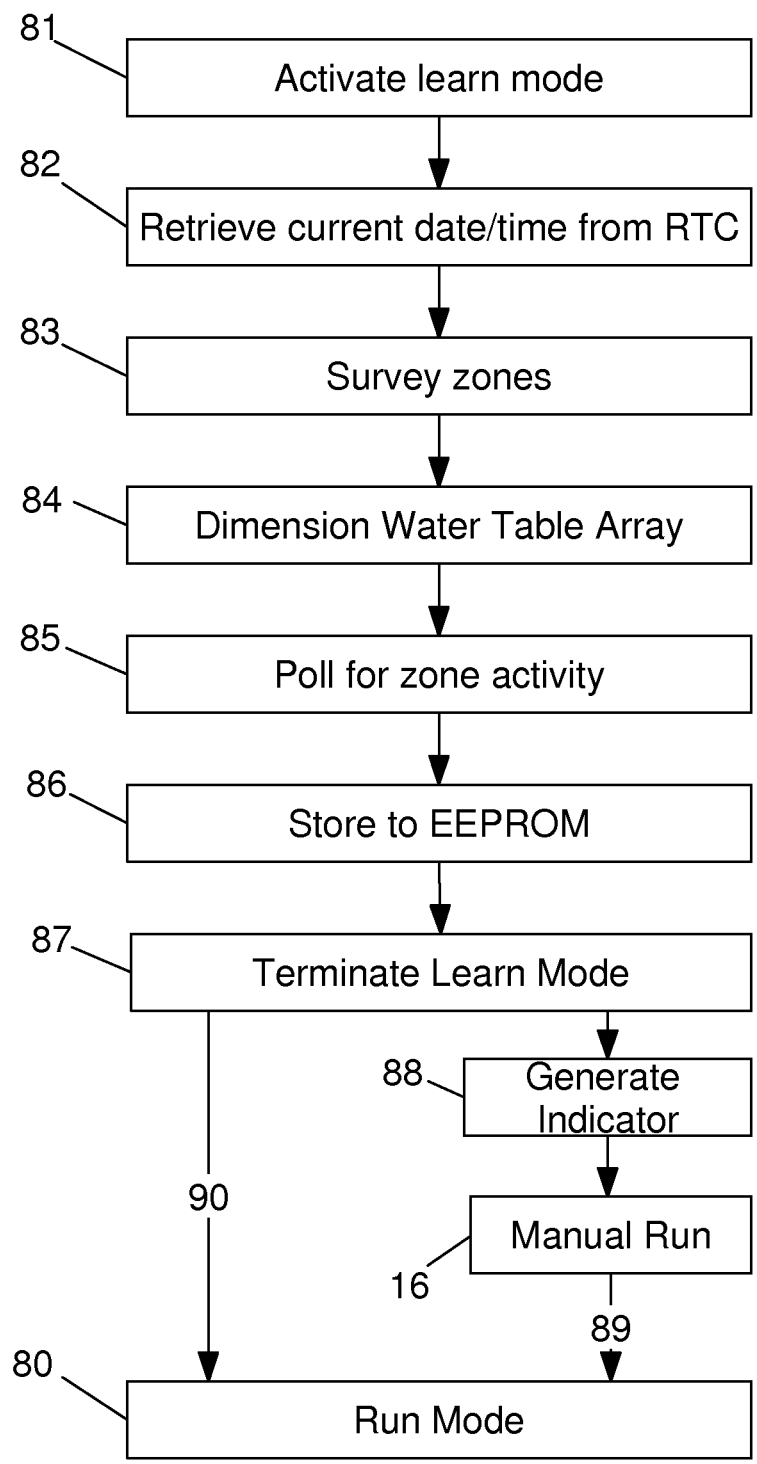
FIG. 12 depicts a flowchart of the learning mode method.

As shown in the flowchart of FIG. 12, to continue setup of the add-on FROG controller after connection of the wiring, the user activates 81 the device to "learn mode." This may be accomplished by engaging "learn mode" input 17 (FIG. 1, FIG. 8). Once learn mode is initiated, the microcontroller program retrieves 82 the current date and time from the RTC 25. The microcontroller program then surveys 83 the number of zones wired to the existing controller 20 by sensing the presence of polarized voltage levels via the AC/DC opto-couplers input sensing circuits 14 (FIG. 8). Using this information, the microcontroller program dimensions 84 the watering table array. Once completed, the microcontroller program polls 85 for zone activity equating to start times and run-time durations. It accomplishes this, for example, by using an AC/DC opto-coupler input sensing circuit 14 to sense zone activity through DC voltage level transitions and/or alternating voltage level transitions at a standard frequency, such as 50 Hz, 60 Hz, 120 Hz, etc. In this first learn mode method, the learn mode extends over a default period of two weeks. Those skilled in the art will know that other default periods may be used, however, two weeks corresponds to the most typical default period in that homeowners using "skip-day" programs run through their entire irrigation cycle over a two-week period. The data collected in learn mode may be stored 86 in storage medium 26.

Depending upon the pre-determined default period, the RTC 25 may generate an interrupt to terminate 87 the learn mode that is passed to the microcontroller 22, which is interpreted by the microcontroller program as a termination of learn mode. Alternatively, the microcontroller program may store the ending date and time as an ending sentinel for a matched value-type termination routine. At this time, the microcontroller program preferably generates 88 a visual or audible indication, such as a flashing LED 66 (FIG. 8), that learn mode is complete. Reacting to this, the user may activate 89 run mode, such as by pressing a run mode input button 16, or the microcontroller program may be programmed to automatically initiate 90 run mode 80, which effectively transfers watering schedule control to the FROG controller.

Another aspect of the invention, in which the learn mode may be a four-week process, is presented to accommodate the installation of the FROG controller 10 at times of the year other than during the summer (since in summer the maximum water volume is already appropriate). For example, if the FROG controller 10 is to be installed in mid-winter when the water requirement for the landscape is minimal, a great deal of water is wasted if the summer maximum schedule is applied daily for two weeks in order to allow the FROG controller 10 to learn the summer maximum schedule.

During the first two weeks of the four-week learn mode, the existing controller 20 is not adjusted to the summer maximum watering schedule, but continues on its existing, preset schedule. The FROG controller 10, in a learning-override mode, learns this "starting-point existing schedule" during the course of the first two weeks, but does not control the water control valves. At the end of the first two weeks, the existing controller 20 needs to be reset by the user to the summer maximum water start times and run-time durations for all of the zones. Therefore, at the end of the first two weeks, an audio or visual reminder may be produced by the FROG controller 10, or in addition or instead, an outside reminder input (such as a reminder letter, email, text or phone call from the water authority) may remind the homeowner of the need to reset the existing controller 20 to the summer maximum watering schedule.

Though the FROG controller 10 learns the start times of the summer maximum watering schedule and may be programmed to duplicate them, optionally the FROG controller 10 may be programmed to automatically shift the start times toward the middle of the day during colder months. Generally the summer watering hours may be restricted by the water authority to the morning hours, such as before 10 a.m., to minimize evaporation. Start times forced into the early morning may not be optimum for colder months. The FROG controller 10 can be preloaded (Block 7, FIG. 14) with any mandated no-watering hours, as well as mandated no-watering days. Optionally, the mandated regulations can be input into the FROG controller via the data input system 70 [Block 8, FIG. 14] or wireless system [Block 9, FIG. 14]. The FROG algorithm can give consideration to the mandated no-watering hours and to the climate of the local geographic area and adjust the start times, as needed.

In the second two-week period of the four-week learn mode, the FROG controller 10, in a learning-controlling mode, enforces the starting-point existing schedule by controlling the water control valves 30, as learned during the first two-week period. Additionally, over the second two week period the FROG controller 10 learns the newly set summer maximum watering schedule and stores this summer maximum watering schedule in storage medium 26. The landscape receives the same amount of water in the second two-week period (as controlled by the FROG controller 10) as it received during the first two-week period. In this way, without overwatering by using the summer maximum watering schedule during the fall, spring or winter, the FROG controller 10 can learn and store the summer maximum watering schedule for use in the FROG integration and/or FROG algorithm. At the end of the four-week learn mode, run mode is activated in the FROG controller 10, as described above (either by manual control device 16 (FIG. 12) of the user or, more preferably, by automatic initiation 90 by the microcontroller program).

In an optional aspect, the learn mode may be implemented as a learn-while-managing method. In the learn-while-managing method the homeowner installs the FROG controller 10 and immediately sets the existing controller for the peak summer maximum watering schedule. The FROG controller 10 is set to overrule the existing controller and disallow watering for a time period of at least 24 hours (any portion of the first day remaining plus at least one full watering day). During this overruling time period, the FROG controller 10 learns at least 24 hours of the homeowner-set peak summer watering schedule. For example, if the FROG controller 10 is installed on Monday, but the first watering day set for the summer peak schedule is Wednesday, the FROG would disallow the watering schedule programmed for Wednesday while learning the single day. The FROG controller 10 will then use a temporary learn-while-managing FROG algorithm applying the evapotranspiration data 120 (FIG. 14) to only the one day of watering data from Wednesday. On the next day, Thursday, it controls the water valves to dispense that temporary water budget. While implementing the temporary water budget and schedule on Thursday, the FROG controller 10 will continue to disallow the existing controller's programmed schedule for Thursday (if any), but will learn it. So the water is only delayed one day. If the existing controller's summer maximum schedule is not set for Thursday, the FROG controller 10 will still apply the temporary water budget, but will necessarily wait until the next set watering day to learn the second day's data. At the end of the second watering day, the FROG controller 10 will have learned the summer maximum watering schedule for two watering days, so will apply the temporary learn-while-managing FROG algorithm to the data available, and so on and so forth, until a full week or, optionally, two weeks is learned. At that time, the entire summer peak watering schedule has been learned, so thereafter run mode is activated and the FROG controller 10 will use the standard FROG algorithm 100 (FIG. 15) to produce the customized water budget and schedule. Advantageously, this learn-while-managing method negates the need for the homeowner to return to the FROG controller 10 at the end of the learning time.

Run Mode

Once in run mode, the microcontroller program first determines the day of the week by accessing the RTC 25. If it is a no-watering day based upon loaded regulation data or a voluntary watering restriction, then the FROG controller does not activate any water control valves 30 throughout that day.

If it is not a no-watering day, the microcontroller program uses the current date from the RTC 25 to determine the current season of the year. Using this information, the microcontroller program applies the FROG algorithm to determine a "FROG watering budget" for the next irrigation cycle (an amount of water comprising the optimal watering budget for the next irrigation cycle). Optionally, as in the fifth embodiment, the microcontroller program may simply implement the customized water budget/schedule 105 derived by the FROG algorithm using the online wizard.

Figure 10:
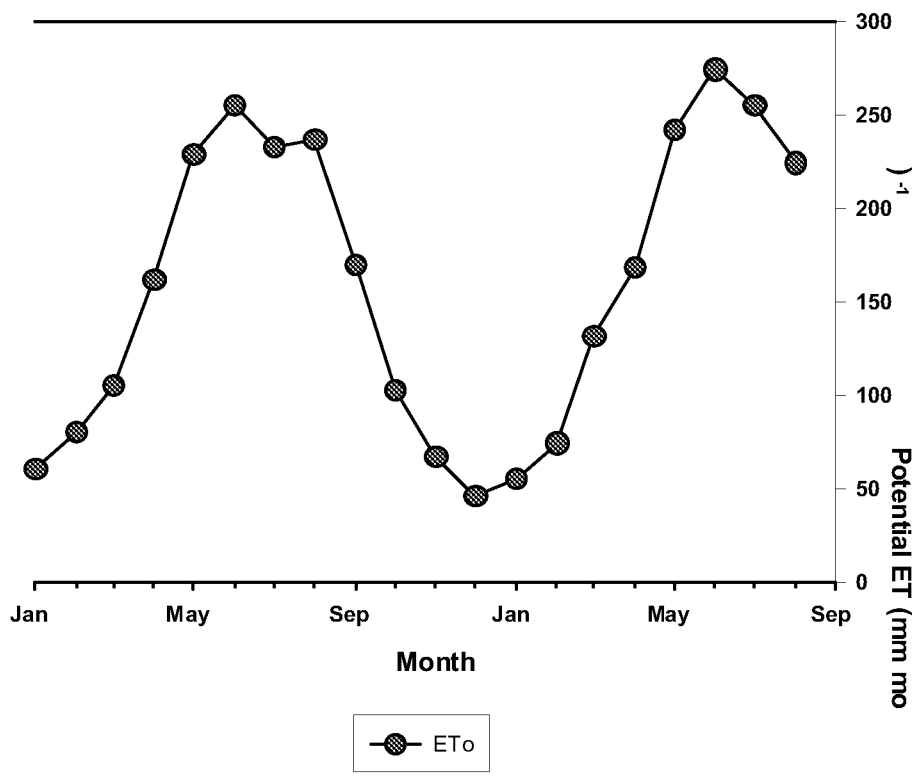
FIG. 10 depicts the reference evapotranspiration curve (from which ETo_local for each time point is derived) of the type used by the FROG smart controller to determine the correct watering needs of landscape material in a given geographic location, such as the Las Vegas Valley, for a given time of year.

Whether calculated by the FROG algorithm within the FROG controller or by the FROG algorithm using the online wizard, the determination of this FROG watering budget and FROG schedule (start times, run durations, days to water for each zone) to implement the water budget is made by using the value of ETo_local corresponding to the ETo value of the particular day (or an average of a set of values corresponding to nearby days) from the ETo characteristic curve table of values for the designated geographic location, such as depicted in FIG. 10. This FROG water budget and schedule, comprising a modified and/or compensated run-time duration, may be stored in storage medium 26. The microcontroller program then activates the relay 27 that, in turn, activates the applicable water control valve 30.

Comparison to Conventional Controllers

This is in contrast to many prior art add-on smart controllers that do not themselves control water control valves but actively monitor the existing controller outputs and interrupt the controller, typically over the Common wire, to modify irrigation run-time durations. The prior art arrangement effectively doubles the risk of unreliability because, while the FROG controller only risks disrupting irrigation if it malfunctions itself, prior art smart controllers risk disrupting irrigation if either they malfunction themselves or the existing controller malfunctions itself.

Also, as opposed to the smart irrigation controllers of the prior art, the FROG controller 10 enforces mandatory watering restrictions, provides incremental water adjustments, and provides a water budget sufficient for the property's landscaping (when using the learn mode the water budget is based on the total water volume at the summer peak watering settings of the existing controller 20 delivered over a time period, such as a week or since the last watering day), taking into consideration the number of no-watering days and calculating compensation coefficients along with delivery frequency adjustments.

Prior art smart controllers are merely programmed to reduce this daily watering volume by applying an evapotranspiration rate (or by one of a variety of means), without considering the additional reduction that will occur as days are removed by mandated watering restrictions. For example, the summer maximum watering schedule is applied every day for seven days in the summer when all days are watering days. Then, in mid-winter, these controllers cut back the daily summer maximum watering volume, appropriately resulting in a significant reduction in water to be delivered on a daily basis (a "winter reduced daily volume"). However, prior art smart controllers do not take into account the large number of no-watering days that may be mandated by local water authorities. Consequently, the "winter reduced daily volume" is, in fact, not applied daily, resulting in an over-reduction in water delivery. For instance, in the Las Vegas Valley, only one watering day is allowed in winter—consequently six days are no-watering days. If this is not taken into consideration, the water delivered to the homeowner's property is a mere fraction of the needed amount determined by landscaping needs: only one of the winter reduced daily volume amounts is delivered on the one available day.

Exemplary Frog Algorithm Applying Frog Integration

In one exemplary aspect of the FROG algorithm, the microcontroller program of the FROG controller 10 may use the FROG algorithm to calculate the initial total volume of water delivered by the existing controller during a particular time period (a particular number of days near the day of watering, such as the week before watering, as used in the below example, $Mo_{x/wk}$, FIG. 11). This total volume ($Mo_{x/wk}$) is proportionally distributed (with other factors taken into account) to the number of allowed watering days near the day of watering, such as a weekly cycle. This total volume of water ($Mo_{x/wk}$) may be used in the determination of the scaled watering minutes for each watering event for each zone ($Ms_{x/event}$, FIG. 11). The FROG algorithm may also be used by the FROG system to assist in calculating the customized FROG water budget and watering schedule 105 (FIG. 15), a schedule based on the initial watering schedule of the existing controller 20 but modified by the FROG integration of mandated watering restrictions and the empirically-derived evapotranspiration local characteristic curve and/or other factors, as herein presented.

Two refining factors, a watering depth factor W and a compensation coefficient S may be used to further refine the optimal watering budget.

The watering depth factor W provides a reduction in water delivery, reflecting a reduced watering requirement due to the increased watering depth provided when utilizing the customized water budget and schedule 105 (FIG. 15) provided by the FROG algorithm. As promoted by the local water authorities, the FROG controller 10 delivers a proportionally larger volume of water that is applied at less frequent intervals. Consequently, the water penetrates the soil more deeply, less surface evaporation occurs, and more water is left in the soil for the plant to access. Additionally, the less frequent, deeper watering provided by using the FROG algorithm encourages deeper root growth in plants, resulting in healthier plants.

The compensation coefficient S is used to further refine the FROG algorithm of the present invention. The compensation coefficient S is a factor correcting for lack of daily watering frequency due to mandated no-watering restriction days, the corresponding plant seasonal moisture needs, and an assumed soil type characteristic of the locale (affecting the water delivery rate [percolation] calculations).

Figure 11:
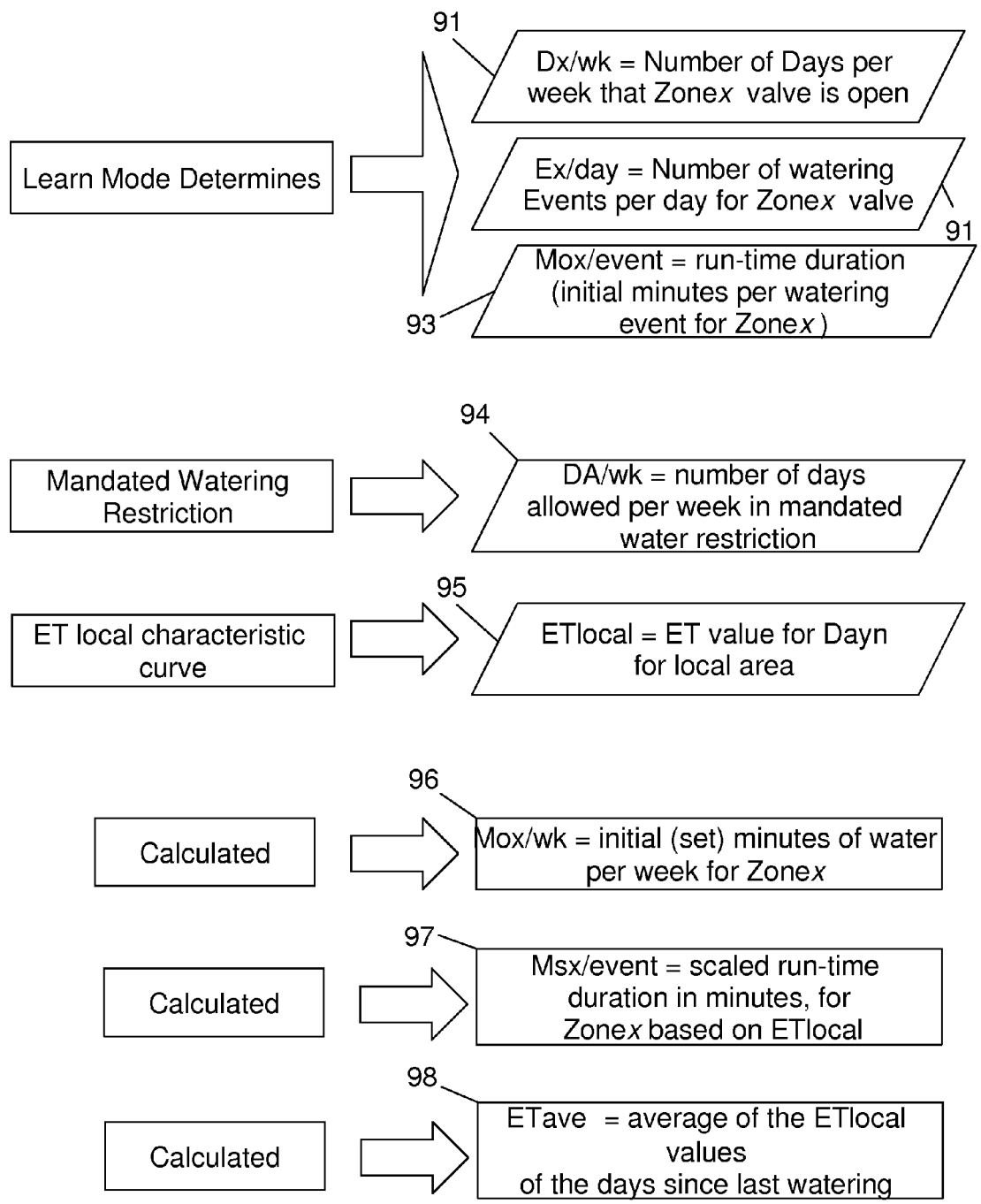
FIG. 11 depicts a schematic of the variables of an exemplary FROG algorithm of the FROG integration.

Referring to FIG. 11, the FROG algorithm used by the FROG controller 10, includes the following variables:

$D_{x/wk}$=Initial number of Days per week that Zone valve is open (91, FIG. 11)

$E_{x/day}$=Initial number of watering Events per day for Zone valve (92, FIG. 11)

$Mo_{x/event}$=Minutes of initial run-time duration (initial minutes per watering event for Zone from existing controller settings) (93, FIG. 11)

$Mo_{x/wk}$=initial watering Minutes of water per week for Zone (from existing controller settings) (96, FIG. 11)

$Ms_{x/event}$=Scaled watering Minutes (run-time duration) of water per event for Zone (96, FIG. 11)

$D_{A/wk}$=number of Days Allowed per week considering mandated 135, FIG. 14 and voluntary 190, FIG. 14 watering restrictions (94, FIG. 11), with a minimum value of 1. This is preloaded (Block 7, FIG. 14) in the first embodiment, but in the fifth embodiment may also be input through the data input system 70 (Block 8, Block 23, FIG. 14) or through the wireless system 150 (Block 9, Block 24, FIG. 14).

ETo_local=value for Day, from ET local characteristic curve (95, FIG. 11). This is preloaded (Block 4, FIG. 14) in the first embodiment, but may also be input via the data input system 70 [Block 5, Block 20, FIG. 14] or wireless system [Block 6, Block 21, FIG. 14] before distribution of the FROG controller 10 or by the user at a later time.

$ET_{ave}$=average of the ETo_local values of the days since last watering (98, FIG. 11)

W=Watering Depth factor allowing reduction of the total volume of water due to the reduction in water need due to the increased depth of watering resulting from a larger volume of water applied at larger intervals S=Compensation coefficient, a factor correcting for lack of daily watering frequency due to no-watering restriction days (mandated or voluntary), the corresponding plant seasonal moisture needs, and an assumed soil type characteristic of the locale (affecting the water delivery rate [percolation] calculations)

As seen in FIG. 11, the variables $D_{x/wk}$, $E_{x/day}$, and $Mo_{x/event}$ are determined from the learn mode in the first embodiment. The $D_{A/wk}$ and ETo_local may be pre-loaded (Block 7, Block 22, Block 4, Block 19, FIG. 14) or input via the data input system 70 [Block 8, Block 23, Block 5, Block 20, FIG. 14] or wireless system [Block 9, Block 24, Block 6, Block 21, FIG. 14] into the FROG controller 10. And $Mo_{x/wk}$ and $Ms_{x/event}$ are calculated in the following equation:

$$Mo_{x/wk} = (D_{x/wk}) * (E_{x/day}) * (Mo_{x/event})$$

For example (for a single zone x, summer maximum set at existing controller):

5 min/event*3 events/day*7 days/week=105 minutes/week

The $Ms_{x/wk}$ derived from UN-AVERAGED ETo_local (using the ETo_local of the particular date) is derived from the following equation:

$$(Mo_{x/Wk}/[D_{A/wk} * E_{x/day}]) * (ETo\_local) * S * W = MS_{x/wk}$$

A somewhat more refined $Ms_{x/wk}$ may be obtained by averaging multiple ETo_local values (averaging the ETo_local values of the days since last watering or another set of ETo_local values from nearby days).

First $ET_{ave}$ is calculated by averaging the ETo_local values corresponding to the days since the last watering; then $ET_{ave}$ is substituted in the above equation resulting in the following equation:

$$(Mo_{x/wk}/[D_{A/wk} * E_{x/day}]) * (ET_{ave}) * S * W = Ms_{x/wk}$$

So, in the above example, 105 minutes/week divided by 3 days per week (allowed by watering restrictions) times 3 events per day (the number of watering events per day programmed in the existing controller)=11.66 minutes/event multiplied by the Compensation coefficient S and the Watering Depth Factor W and the scale factor ETo_local (in the un-averaged equation) or $ET_{ave}$ (in the averaged equation).

Many modifications may be made to the above equations to provide further benefits or to achieve conservation goals. For example, though the example variables are based on a time period of a week, other time periods are equally usable, such as a two-week period. Or, for another example, the algorithm can be simplified, such as by omitting the S coefficient or the W factor.

Also, optionally, instead of using $E_{x/day}$ to determine $Ms_{x/wk}$, (where $E_{x/day}$ represents the number of watering events per day for $Zone_x$ of the summer watering schedule), it may be desirable to use a reduced number of watering events per day (for instance in winter when watering is minimized). Thus a winter algorithm might use $E_{W/day}$ (where $E_{W/day}$ represents the number of watering events per day for $Zone_x$ preferred in the winter season):

$$(Mo_{x/wk}/[D_{A/wk} * E_{w/day}]) * (ET_{ave}) * S * W = Ms_{x/wk}$$

Another modification may be made to the above exemplary equations to account for the voluntary no-watering day discussed below. If the voluntary no-watering day is enabled, the $D_{A/wk}$ (the number of days allowed per week as defined in the mandated watering restriction) would be reduced by 1 (the one voluntary no-watering day) unless that would result in zero watering days. Therefore, the minimum for $D_{A/wk}$ is one day, as the minimum number of watering days a week is one day.

The usefulness and/or novelty of the algorithm combines with the usefulness and/or novelty of the integration of the mandated no-watering days and the empirically-derived evapotranspiration local characteristic curve, with the possibility of further integrating the voluntary no-watering day, and in the availability of the presented variables, factors, and coefficients for manipulation to derive a FROG watering schedule that achieves the goals of adequate water delivery for the landscape and of water conservation.

Once the foregoing process is complete, the microcontroller program awaits the next start time, whereupon the process may be repeated, and so on and so forth until the entire irrigation cycle is complete. When the entire irrigation cycle is complete, the entire process repeats at the next scheduled irrigation cycle, and may continue to do so until an error occurs or the user intervention stops the cycle. There is no inherent need for the user to reprogram or interact with the FROG at the onset of a new season as previously required for conventional irrigation controllers.

Override Mode

In an aspect, the FROG controller may have a bypass or "override mode" permitting the user to operate his existing controller manually as though there were no FROG in series between the existing controller 20 and the irrigation valves 30. Preferably, the FROG is configured with manual input device 18 to activate override mode, along with an audible or visual indicator device 67, such as a flashing LED, to signal that override mode is running. For aesthetics, the input device 18 and indicator 67 preferably coordinate in appearance and location the other manual control devices 15, 16, 17, 19 and indicators 66, 65 of learn mode and run mode. When the user has activated override mode, the microcontroller program performs all functions as usual, except that instead of causing "on" and "off" commands to be communicated to the relays 27 operating the irrigation valves 30, it simply causes the "on" and "off" commands of the existing controller 20 to be communicated to the relays 27 operating the irrigation valves 30.

At times, the user may forget to activate the override mode. Various accommodations may be made to deal with this situation. For example, the user may have just planted a new plant in a particular zone and, consequently, may decide to manually run the particular zone for an exceptional watering. If the FROG controller 10 immediately "learns" the one-time run of the particular zone, the watering budget and schedule may be updated based on the one-time run. However, this may not be the case. Rather, it may be the case that the user wishes to alter the existing watering schedule of the particular zone on a permanent basis and, therefore, makes a change to the run time of the zone. If the FROG controller 10 does not "learn" the change, the plants will not receive the changed amount of water on an ongoing basis. Therefore, preferably, the FROG controller 10 is configured to hold any newly changed settings until a particular grace time period has passed (such as midnight of the day of the change, ten or twelve hours from the change, etc.). An indicator (visual, auditory, or both) and/or on-screen message can say, "Is this a temporary change?" If the user does not respond within the grace period, the change is considered to be an intended setting change. Thus, this additional time gives the user a grace period wherein he can remember to cancel the change if it is a one-time change instead of an intended setting change.

In another exemplary method to ascertain whether the user intends to alter the existing watering schedule of the particular zone on a permanent basis or to perform a one-time exceptional watering allows the FROG controller 10 to refuse to implement the water command until the user designates his choice. The FROG controller 10 will respond to the user's attempt to manually intervene without selecting "bypass" by warning the homeowner to switch to bypass if a permanent change is not intended. This reminder occurs by means of a visual and/or audible signal, but more importantly (since the user is interacting with his existing controller, not the FROG controller 10), by not activating the valve(s) unless and until the user either switches to bypass mode on the FROG controller 10 or indicating, on the FROG controller 10, that he desires the change to be permanent. Disabling the activation of the valve(s) compels the user to designate a choice in ways the audible or visual signal may not.

When the FROG controller is in the four-week learn mode, during the first two weeks the microcontroller program operates the FROG controller as though it were in override mode for purposes of irrigation. However, operation in override mode is not indicated by the override mode indicator and, unlike override mode, the FROG controller 10 surveys the wired zones, etc., as provided above.

Second Embodiment

Manual Property-Specific Data Input

The second embodiment, shown in FIG. 2, of the FROG 10 is a comprehensive, standalone controller, which also utilizes the FROG integration of the present invention, but additionally is configured with all the functionality of a conventional irrigation controller, allowing a user to manually input property-specific data (watering days, start times, run-time durations for the various zones). There is no longer a need for the existing controller 20 or another conventional controller. The user should manually input the property-specific data representing the water budget and schedule for the middle of the summer for use in the FROG algorithm. The FROG algorithm then uses the property-specific data that has been manually input as a substitute for the property-specific data learned in the first embodiment, and calculates the water budget and schedule for the current day of the year.

Figure 13:
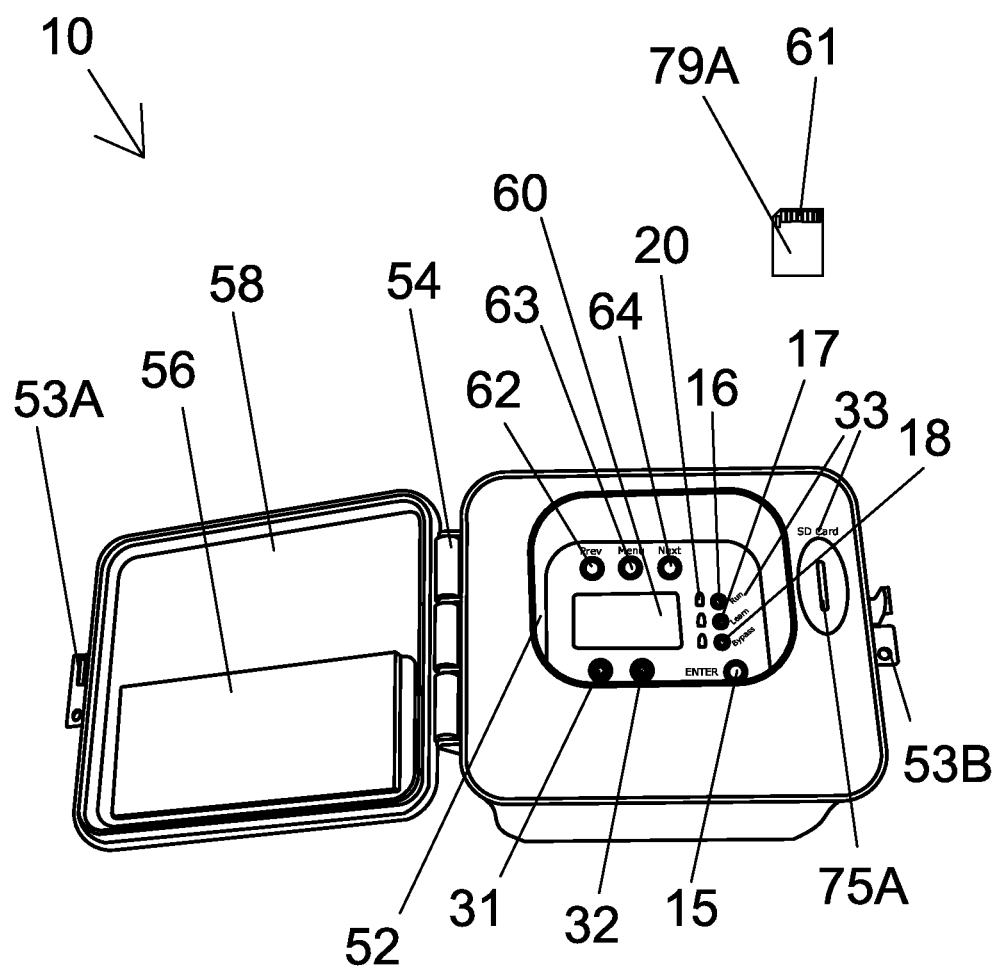
FIG. 13 depicts a perspective view of the FROG controller of the fifth embodiment of the present invention wherein the data input system comprises an SD card receiving slot.

In the second embodiment, conventional rotary dials 57, switches, and digital input devices allow the user to manually program the FROG comprehensive, standalone controller 10. The standalone controller 10 may be housed in an open housing 48 (FIG. 4) or in a housing with a door 58 (FIG. 2, FIG. 13). If installed in an inside location, a conduit 59 may be connected to the housing to allow the field wires to be routed to the outside water control valves 30.

Third Embodiment

Sensor Input

The third embodiment of FIG. 3, FIG. 4, and FIG. 9 also utilizes the FROG integration and/or FROG algorithm of the present invention, but further includes at least one local or remote environmental sensor 41, 42 operable to measure environmental conditions, such as temperature, humidity, solar radiation, soil moisture, rainfall, or the like, as are known, or may become known, in the art. The local sensor may be disposed within or adjacent to the housing 48, 58 and may be directly or wirelessly connected to the main control unit 24.

With the remote sensor, a sensor module 60 may be included that is connectable to either the add-on FROG (FIG. 3) or the standalone FROG (FIG. 4). The sensor module 60 is operable to communicate with a remote weather station 55 (FIG. 3, FIG. 4, FIG. 9). Preferably, the environmental sensors 41, 42 are configured to communicate wirelessly with the main control unit 24, which is configured to receive and process the received remote sensor data. The remote weather station 55 includes one or more operable environmental sensors 41, 42 (FIG. 9). Optionally, the sensor receiver may be located within the housing 48, 58, instead of in a connectable module.

The addition of one or more environment sensors 41, 42 to provide current environmental data may, in some cases, provide a beneficial refinement to the FROG integration and/or FROG algorithm of the present invention. Additionally, some municipalities mandate the usage of one or more sensors with any installed automatic irrigation controller (such as a mandated rain gauge). Thus the FROG controller 10 of the third embodiment is adapted to meet that requirement.

The remote, freestanding weather station 55 is preferably mounted in an exterior location where accurate environmental readings can be obtained. Preferably the sensor data are wirelessly transmitted by a transmission device, such as RF transmitter 43 (with antenna 38), to obviate the need for wiring. Therefore, the weather station 55 is preferably situated in a suitable location to allow wireless communication through walls made of ordinary construction materials. The FROG controller 10 is configured with a corresponding RF receiver 39 (FIG. 8).

Optionally, the sensors 41, 42, as well as the RF transmitter 43, may be powered by a solar-powered system, comprising a solar energy conversion panel 45, solar charger 47, and a charge storage system 46. Use of such a solar-powered system eliminates the expense, maintenance and disposal of batteries, plus avoids the inevitable disruption caused by undetected battery failure.

In one exemplary aspect, the sensors 41, 42 output their readings to modulation device 44 that is set to turn on the RF transmitter 43 and relay readings at a predetermined sample rate, such as once per hour, continuously day and night. The sample rate is sufficient to provide accurate overall environmental values, expressed as an arithmetic average, over the entire time period from one irrigation cycle to the next, but not so frequent as to unnecessarily draw down system resources and interfere with the similar systems operating at adjacent properties.

To use the sensor data, the sensor data are preferably averaged and the values stored in storage medium 26. On watering days, the microcontroller program retrieves the current group of environmental sensor readings in storage medium 26 for the specific time period of interest, preferably, since the last scheduled start time for the zone in question. The microcontroller program uses an environmental-factor calculation algorithm to output a current temperature value and current humidity value. The environmental-factor calculation algorithm preferably calculates the arithmetic average of readings from the time a given irrigation cycle was last scheduled to the time it is next scheduled to derive a "current environmental factor." Other similar environmental-factor calculation algorithms (such as ones that exclude outliers or average only the last two days) are also within the scope of the invention.

The current environmental factor E, may be used as an additional scaling factor in the FROG algorithm, as follows:

$$(M_{ox/wk}/[D_{A/wk}*E_{x/day}])*(ETo\_local)*S*W*E=M_{sx/wk}$$

Fourth Embodiment

Data Input System 70

The fourth embodiment (FIG. 5A, FIG. 5B, FIG. 5C, FIG. 5D, FIG. 6A, FIG. 6B, FIG. 6C, FIG. 7A, FIG. 7B, FIG. 7C) presents an optional data input system 70 for use with either the add-on or standalone FROG controller 10, either with or without one or more environmental sensors. The data input system 70 allows a user (or water authority representative) to conveniently input information into the FROG controller 10, thus the FROG controller 10 can be updated periodically, either frequently or infrequently, as needed.

Data Input System—Optical (Fourth Embodiment)

In a first aspect, FIG. 5A, FIG. 5B, FIG. 5C, FIG. 5D, the data input system 70 includes a data input receiver embodied as an optical code reader 72 within a reader slot 71 configured to receive an insertable sheet 68 imprinted with an optical code 69.

The optical code 69 may be a printed QR Code®, bar code, matrix code, or other two-dimensional code for carrying data. The optical code 69 may contain any of a variety of water restriction information or irrigation controller instructional information; this information is individually customizable for the particular home (or business). For example, optical code 69 may be used to specify the mandated watering restrictions, to specify the assigned watering group, to specify the geographic location, to change the start times, or the like. Moreover, the optical code 69 allows the water authority to implement changes to data loaded into the FROG controller 10, the necessity of which may become greater as the years pass. For instance, if weather and climate patterns change (such as through changes in the La Nina and El Nino patterns, global warming, or the like), the loaded empirically-derived evapotranspiration local characteristic curve may become less reliable. It is easy to update the FROG controller 10 using the optical code 69 (or other disclosed data input system 70); thus the FROG controller 10 will continue to perform within a reasonable range of conservation expectations, with the parameter values at or near current climatic conditions.

The optical code 69 is printed on the insertable sheet 68 in an appropriate location to position the optical code 69 for reading when the insertable sheet 68 is inserted into the reader slot 71.

The optical code reader 72 captures the visual information from the optical code 69 and converts it into a corresponding digital code usable by the microcontroller.

The availability of a simple means to allow the user to input data may be of great advantage to both the user and to the water authority. For instance, the local water authority can (at virtually no cost) routinely print an optical code 69 carrying the mandated watering restrictions, geographic location, the assigned watering group, and/or an updated empirically-derived evapotranspiration local characteristic curve for the home associated with the bill. If the FROG controller 10 experiences a power outage without the backup battery power, one or more settings may be lost or corrupted (including the loaded mandated watering restrictions and/or geographic location and/or assigned watering group). The homeowner merely inserts the bill with the optical code 69 into the reader slot 71 and the optical reader 72 converts the optical data to re-establish the mandated watering restrictions and/or geographic location and/or assigned watering group and/or other settings. Instructions on how to insert the bill so that the optical code 69 is readable can also be printed on the bill. As no interaction is required with the local water authority employees, this method of re-establishing data is very cost effective for the water authority, as well as being convenient for the homeowner.

Additionally, if the homeowner receives digital bills instead of paper bills, the homeowner can log onto his account at the water authority and print the optical code 69 customized for his home, which is then inserted into reader slot 71.

Further, easy instructions can be presented by using the optical code 69. For example, if the real-time clock needs to be reset, the homeowner can log onto his account online and print an optical code 69, which, when inserted into reader slot 71, causes easy, step-by-step instructions for resetting the clock to be displayed on the graphic display 60.

An insertable sheet 68 carrying optical code 69 could optionally be included with a new FROG controller 10, to initially establish some variables.

Data Input System—Magnetic (Fourth Embodiment)

Figure 6A:
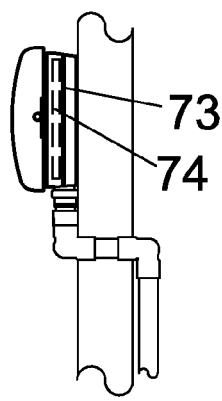
FIG. 6A depicts a side view of the FROG controller of the fourth embodiment of the present invention configured with the data input system embodied as a slide slot and a magnetic strip reader.
Figure 6B:
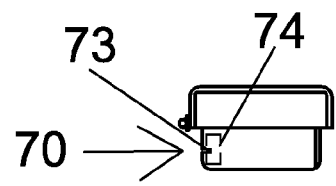
FIG. 6B depicts a top view of the FROG controller of the fourth embodiment of the present invention configured with a data input system embodied as a slide slot and a magnetic strip reader.
Figure 6C:
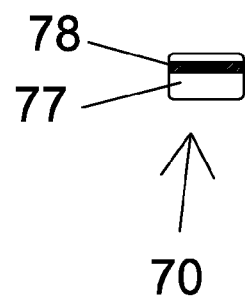
FIG. 6C depicts a front view of a card carrying a data-impregnated magnetic strip configured to slide through the slide slot to allow reading by the magnetic strip reader.

In a second aspect of the fourth embodiment, FIG. 6A, FIG. 6B, FIG. 6C, the data input system 70 includes a data input receiver embodied as a magnetic code/smartcard reader 74 configured with a slide track or slide slot 73 configured to receive a data-carrying card 77 (such as a plastic card with an embedded magnetic code using magnetic stripe technology or a smartcard having an embedded microprocessor with stored data or the like). The FROG controller 10 is configured with the slide track 73, the magnetic code/smartcard reader 74, and corresponding circuitry.

The card 77 carrying data 78 may be similar to a credit card in size. Data-carrying card 77 can be supplied to the homeowner upon request or might optionally be included with a new FROG controller 10. The magnetic code/smartcard reader 74 is adapted for reading the carried data 78.

In a similar manner as in the first aspect, the carried data 78 can contain any data or information needed by the homeowner, such as mandated watering restrictions, geographic location, assigned watering group, etc.

Data Input System—Data Storage Unit (Fourth Embodiment)

Figure 7A:
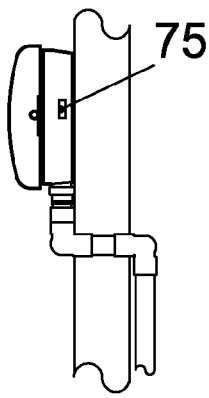
FIG. 7A depicts a side view of the FROG controller of the fourth embodiment of the present invention configured with a data input system including a controller electronic connection for receiving a data storage unit.
Figure 7B:
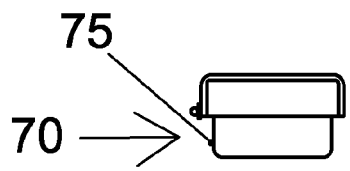
FIG. 7B depicts a top view of the FROG controller of the fourth embodiment of the present invention configured with the data input system including a data storage unit-receiving controller electronic connection.
Figure 7C:
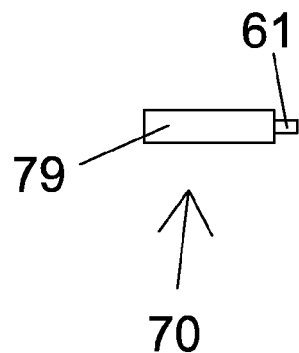
FIG. 7C depicts a front view of a data storage unit, such as a USB flash drive or the like, configured with a complementary electronic connection.

In a third aspect of the fourth embodiment, FIG. 7A, FIG. 7B, FIG. 7C, the data input system 70 is shown as receiving data input via a non-volatile memory storage device. The FROG controller 10 is configured to receive data stored in a data storage unit 79. The FROG controller 10 is configured with a data input receiver embodied as a magnetic code/smartcard reader 74 an electronic interface 75 configured to receive a complementary electronic connector 61 of the data storage unit 79. The electronic interface 75 may be an industry standard connection (such as a USB interface, an SD card interface, or other conventional non-volatile data storage device interface) allowing communication to be established between the external data storage unit 79 and the FROG controller 10. The microcontroller is configured to read the digitally stored data on the data storage unit 79.

As illustrated, a data storage unit 79, such as a flash drive or other non-volatile memory card, can be configured with complementary electronic connector 61. Optionally, a computer having scheduling and/or irrigation software could interface with the FROG controller 10 via the electronic interface 75 to facilitate remote control, to allow dynamic scheduling capabilities, and/or to input the customized water budget/schedule 105.

The data input system 70 of the third aspect functions similarly to the data input systems 70 of the first and second aspects and can contain data for establishing data, re-establishing data, inputting the customized water budget/schedule 105, and/or providing instructional information. Additionally, sufficient data can be conveyed to the FROG controller 10 to update the microcontroller program.

Fifth Embodiment

Data Storage Unit and Wireless

FIG. 13 illustrates the preferred fifth embodiment of the present invention, and shows a preferred type of the data input system 70 in which the FROG receives data via a a data input receiver embodied as an SD card reader having an electronic interface 75 complementary to an SD card interface 61. The data storage unit 79 is an SD card 79A configured with the complementary electronic connector 61 which is inserted into the SD card slot 75A. Though illustrated as a Secure Digital (SD) memory card, other non-volatile memory cards (such as SDHC, SDXC, SDIO, miniSDHC, microSDHC, Memory Stick, Compact Flash, MMC, or other formats of data storage units containing non-volatile storage memory, as known in the art or become known in the future, preferably that can be electrically erased and reprogrammed) are within the scope of the invention.

The preferred fifth embodiment of FIG. 13 may be located in an indoor location (such as a garage) or in an outdoor location. To facilitate placement in the outdoor location, to provide storage for instructions, and for aesthetic reasons, the FROG controller is configured with a door 58 connected by hinges 54 to the main housing of the FROG controller 10. The door 58 may also have a door locking mechanism 53A that is configured to engage with the complementary housing locking mechanism 53B. Preferably the door 58 is also configured with a door pocket 56, allowing the homeowner to store instructional materials, notes, or the like in a convenient location. Preferably, to provide further weather resistance, the manual control devices 15, 16, 17, 18, 19 and indicator device 65 (shown as an indicator light) may be recessed within a cavity 52. Labeling 33 is preferably used to assist the user in installing and updating the FROG controller 10. The housing 58 is preferably formed of a material having a surface that will readily accept labeling 33.

Means Of Inputting Data Into The Frog System (FIG. 14)

As shown in FIG. 14, the FROG controller 10 of the fifth embodiment may be configured as any of the following: (1) an add-on FROG controller 10A controlling the water valves, but used with an existing controller; (2) a standalone FROG controller 10B controlling the water valves without an additional controller; or (3) a converted FROG controller 10C in which the controller is used first as an add-on controller, but at the time of installation has the potential and functionality included to be converted to a standalone controller at a later time.

A converted FROG controller 10C might be advantageous to allow a water authority to encourage initial early installation of the controller functioning as an add-on FROG controller 10A. Then, as resources are allocated and time permits, an additional system, such as the data input system 70 or wireless system 150 can be implemented, with the converted FROG controller 10C then able to function as a standalone FROG controller 10B.

As illustrated in FIG. 14 in Block 1, the add-on FROG controller 10A can obtain property-specific data 110 by using the learn mode 140. As presented in the first embodiment of FIG. 1A and FIG. 1B, the add-on FROG controller 10A may have only the learn mode 140 available to obtain property-specific data 110. However, in the preferred fifth embodiment, optionally, by use of the customization wizard (FIG. 15) to create a customized water budget/schedule 105 the property-specific data 110 can be input through data input mode 70 functionality (Block 2) and/or wireless input mode 150 functionality (Block 3) can be included. This allows the FROG controller to be transformed into a converted FROG controller 10C, removing the necessity for an additional controller, existing controller 20.

As shown in Blocks 4 to 6, the add-on FROG controller 10A may obtain the evapotranspiration data 120 by having it preloaded 160 into the memory storage medium 26 of the system before distribution to the homeowner, by using the data input mode 70, and/or by using the wireless input mode 150.

As shown in Blocks 7 to 9, the add-on FROG controller 10A may obtain the mandated 135 portion of the regulation data 130 by having it preloaded 160 into the system before distribution to the homeowner, by using the data input mode 70, and/or by using the wireless input mode 150.

As shown in Blocks 10 to 12, the user may input his choice of a voluntary no-watering day (voluntary no-watering data 190) by manual input 165 into the system, by use of the customization wizard to create a customized water budget/schedule 105 that is input by using the data input mode 70, and/or by using the wireless input mode 150.

As shown in Block 13, the customized water budget/schedule 105 may be obtained by the add-on FROG controller 10A by calculating 155 it based on the FROG algorithm 100 as described above.

As shown in Blocks 14 to 15, the customized water budget/schedule 105 may be obtained by the add-on FROG controller 10A through use of the web-based wizard (FIG. 15), then by using the data input mode 70 and/or by using the wireless input mode 150.

As shown in Block 16, the standalone FROG controller 10B can obtain property-specific data 110 by manual 165 manipulation of physical dials, buttons, and controls, as in the second embodiment of FIG. 2.

As shown in Blocks 17 to 18, by use of the customization wizard to create a customized water budget/schedule 105, the standalone FROG controller 10B receives property-specific data 110 by using the data input mode 70 functionality and/or wireless input mode 150 functionality.

As shown in Blocks 19 to 21, the stand-alone FROG controller 10B may obtain the evapotranspiration data 120 by having it preloaded 160 into the system before distribution to the homeowner, by using the data input mode 70, and/or by using the wireless input mode 150.

As shown in Blocks 22 to 24, the standalone FROG controller 10B may obtain the mandated data 135 by having it preloaded 160 into the system before distribution to the homeowner, by using the data input mode 70, and/or by using the wireless input mode 150.

As shown in Blocks 25 to 27, the user may input his choice of a voluntary no-watering day (voluntary no-watering data 190) by manual input 165 into the FROG controller 10. Optionally, by using the customization wizard to create a customized water budget/schedule 105 the voluntary restriction can be input into the system by using the data input mode 70, and/or by using the wireless input mode 150.

As shown in Blocks 28 to 29, the customized water budget/schedule 105 may be obtained by the standalone FROG controller 10B through use of the web-based wizard (FIG. 15) then by using the data input mode 70 and/or by using the wireless input mode 150. The data input mode 70 may be used either by the user or by the distributor of the FROG controller. For example, the user can create the customized water budget/schedule 105 for his FROG controller by use of the web-based wizard, and then the distributor can easily input the customized water budget/schedule 105 into the user's FROG controller by using the convenient data input mode 70 (such as by inserting an SD card to initialize the FROG controller), before the user takes possession of his FROG controller 10B.

Example

Add-On

Any combination of these modes may be used. For example, a convertible FROG controller 10C (FIG. 4) may be issued to a user. The FROG controller 10C could first function as an add-on controller, but would have the unrevealed functionality included to be optionally converted to a standalone controller (for example, at a later time when time and resources allow the water authority to provide the necessary corresponding functionality, such as a website wizard or wireless input system). When initially functioning as the add-on FROG controller, it may be preloaded 160 (Block 4) by the distributor by inserting a data storage unit carrying evapotranspiration data 120 and mandated data 135 into a data storage unit receiver, then may execute the learn mode 140 (Block 1) to acquire the property-specific data 120 with the customized water budget/schedule 105 then calculated 155 (Block 13). If the online customization wizard is available and the user decides to designate one day a voluntary no-watering day, he can use the web-based wizard (FIG. 15) to obtain a new customized water budget/schedule 105; a new SD card 79A (FIG. 13) is mailed to the user, who then inserts it into the SD card slot 75A, thereby using the data input mode 70 (Block 11, Block 23) to update his FROG controller 10, without further calculations needed. Block Block At a later date, the ETo characteristic curve for the geographic area may need adaptation for climate change; if the wireless network system is available, the wireless input mode 150 (Block 14) may be used to update the FROG controller 10 without user input.

Web-Based Customization Wizard

Figure 15:
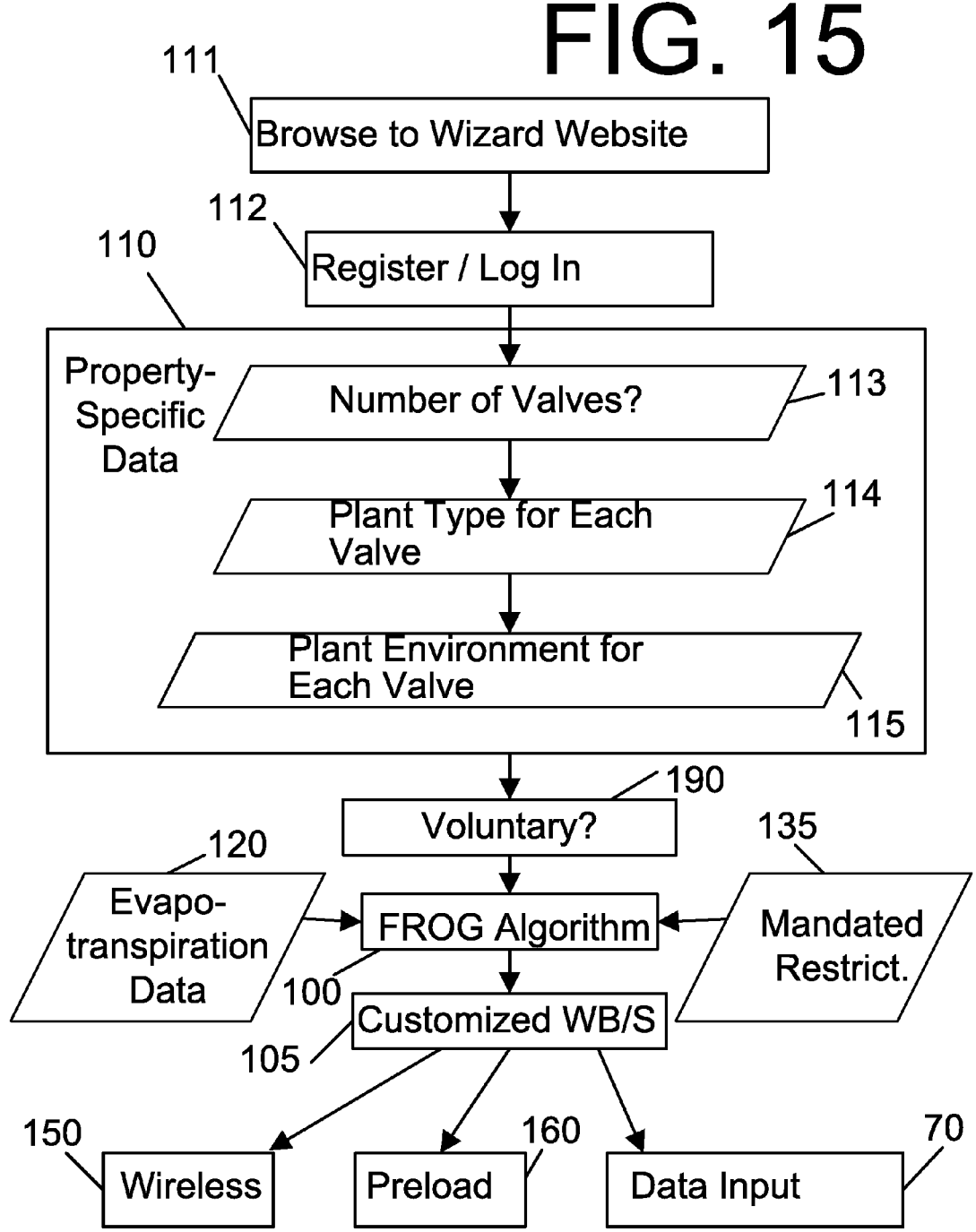
FIG. 15 depicts an online configuration and customization wizard provided to allow the homeowner to input property-specific data enabling the FROG integration and/or algorithm to create a customized water budget/schedule 105 for the homeowner's landscape while implementing regulation data.

FIG. 15 shows steps in using the web-based wizard to create a customized water budget/schedule 105. The customization wizard may typically be presented by the local water authority (or an authorized provider). The customization wizard provides convenient access for the user to utilize the FROG algorithm 100 to create a personal, customized water budget/schedule 105 that can then be input into the user's FROG controller 10. As discussed in relation to FIG. 14, the water budget and schedule 105 may be input through preloading 160 of the system before distribution, by using a data storage unit 79 (such as an SD card, using the data input system 70), or by wireless transmission 150.

To access the configuration and customization wizard, the user browses 111 to the website presenting the customization wizard and registers and/or logs in 112. The first time the user accesses the customization wizard, registration is preferably required to associate a user name and password with a particular property address receiving water from the local water authority. On later visits, the user will preferably only need to log in to the website to use the customization wizard.

The customization wizard allows the user to input any of a variety of property-specific data 110, such as the number of zones or valves 113, the plant type 114 (turf, shrubs, trees, low-water-use native shrubs, etc.) for each of the valves, and the plant environment 115 for the plants in each zone (shade, part sun, full sun, flat, incline, steep incline, sandy soil, loam, etc.). Optionally, the user may walk about his property with an Internet-enabled mobile phone to assist in determining property-specific data 110, using the Internet to access the wizard and directly input information. Also, optionally, a map image, such as a GOOGLE® Earth image may be included within the wizard to assist in inputting property-specific data 110.

The evapotranspiration data 120 (ETo characteristic curve for the geographic area) and the mandated data 135 (permitted watering hours and mandatory no-watering days) are stored in a database accessible by the FROG algorithm 100 and associated with addresses within the area to be served.

Upon input of the property-specific data 110 by the user, the FROG algorithm accesses the evapotranspiration data 120 and the regulation data 130 corresponding to the address of the property, and creates a customized water budget/schedule 105. So, by merely following the straightforward on-screen instructions, the user can input the property-specific data needed to allow the FROG algorithm 100 to create the customized water budget/schedule 105 that provides sufficient water for the landscaping, while implementing the water restriction regulations. As shown in FIG. 14, the customized water budget/schedule 105 can be delivered to the FROG controller 10 via the data input system 70 or the wireless transmission mode 150. The data input system 70 may be used to input the customized water budget/schedule 105 by the distributor before distribution or by the user. For example, the customized water budget/schedule 105 can be placed on an SD card; the SD card with the customized water budget/schedule 105 can be mailed to the user, the user can pick it up at the water district, etc. Alternatively, the user may download the customized water budget/schedule 105 onto his computer and install it onto an SD card or download it directly to an SD card, which can be inserted into the SD card reader.

Wireless Transmission Mode 150

Figure 16:
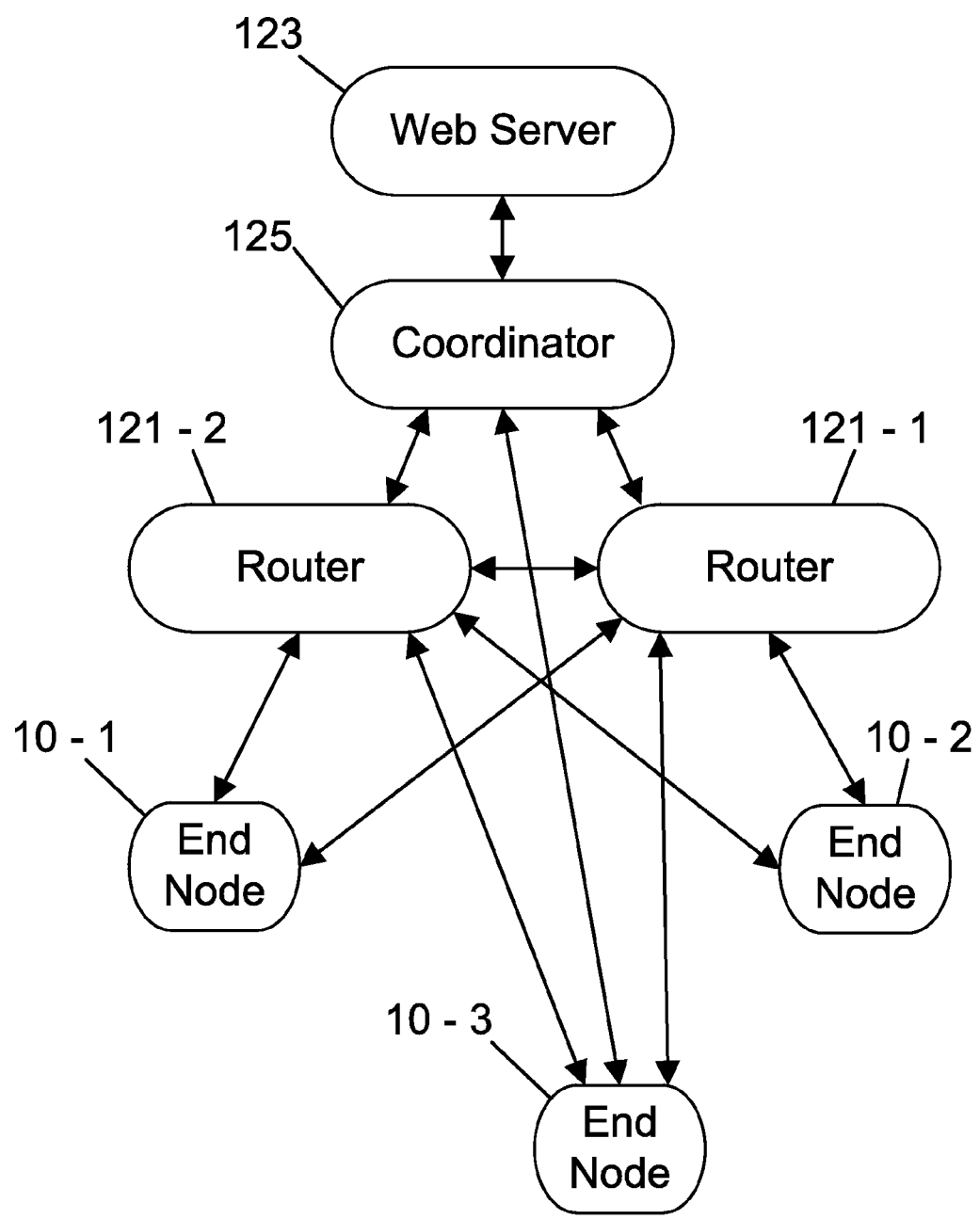
FIG. 16 depicts an exemplary mesh network usable in the wireless input mode of the preferred fifth embodiment of the present invention.

FIG. 16 illustrates an example of the wireless transmission mode 150 in which the a data input receiver is embodied as a wireless data receiver that can be used to input the same types of data into the FROG controller 10 as the data input system 70, described above. These data include, as shown in FIG. 14, the initial or updated customized water budget/schedule 105, property-specific data 110, evapotranspiration data 120, and regulation data 130 [mandated restrictions 135 and voluntary water restrictions 190]). The wireless transmission mode 150 is configured to provide a wireless transmission between the local water authority (or its representative) and the FROG irrigation controller 10 of each homeowner.

Any of a variety of wireless connection methods as are known, or become known, in the art can be used to transmit the customized water budget/schedule 105 to the FROG controller 10 through the use of Internet connectivity, radio-frequency (RF) transmission, cellular phone transmission, or other transmission systems using a standardized communication protocol. Preferably the wireless connection mode chosen is secure and scalable, while allowing the individual FROG controllers 10 to use a transmission component having a small size, low cost, and low power consumption.

Advantageously, the wireless transmission mode 150 may fulfill the data input function for the FROG controller without the expense of a dedicated wireless system, as the water authority may already have in place (or have in development) a wireless system for reading its subscribers' water meters. Thus, if water authority vehicles are roving neighborhoods to read meters wirelessly or if the water authority has a wireless network set up to read meters remotely, the wireless transmission mode 150 may be piggybacked onto the water authority existing wireless system. The water authority wireless system can then efficiently perform two functions at the same time, reading the meters and re-setting FROG controllers 10.

Though other wireless systems are usable, FIG. 16 presents a preferred RF mesh network and transmission components based on the IEEE 802.15.4 standard. An exemplary type of mesh wireless network is currently available using components meeting the ZigBee specification developed by the ZigBee Alliance, which is based on the IEEE 802.15.4 standard and specifies operation in the 2.4 GHz, 915 MHz, and 868 MHz ISM RF bands.

Each FROG controller 10 is configured as a node (10-1, 10-2, 10-3, 10-$n$) on the network. Each FROG controller 10 includes an operative ZigBee end node component, a reduced functionality device (RFD) having a wireless transceiver with an antenna configured to receive and transmit data over the air, but configured for low-power usage and long battery life. The RFDs can wirelessly communicate with a ZigBee router 121-1, 121-2, 121-$n$ or ZigBee coordinator 125. The ZigBee router 121-1, 121-2, 121-$n$ can also wirelessly communicate with a ZigBee coordinator 125. A mesh network web server 123 may be provided to allow configuration and control of the network. The web server 123 may be directly connected or wirelessly connected to the ZigBee coordinator 125. The mesh network web server 123 may additionally also provide the online customization wizard, but preferably the mesh network web server 123 is connected to a second customer-accessible web server that provides the customization wizard. Methods of secure communication provided in the ZigBee specification are preferably used.

Additionally, the end node 10-n can be accessed directly by a user or technician without use of the mesh network, including without accessing the web server 123, the coordinator 125, or the router 121-1. The end node 10-n is provided with functionality allowing it to be accessed via a direct wireless connection to a corresponding connectable computer for diagnostic or local control connectivity, as described in the Zigbee standard.

To use the wireless system, the customized water budget/schedule 105 that was created by the homeowner using the online wizard is transmitted to the mesh network web server 123 from the customization web server (if separate from the mesh network web server 123). The mesh network web server 123 transmits the customized water budget/schedule 105 in packets to the coordinator 125 that wirelessly transmits the customized water budget/schedule 105 to the mesh network, which are received by the individual homeowner's FROG controller 10. The packet transmission may take any of many available routes. The ZigBee specification provides for best effort multi-hop transmission, which is used to provide efficient wireless transmission.

Voluntary No Water "Float" Day

In another aspect of the FROG smart controller of the present invention, the ability for the homeowner to choose to designate one additional day as a user-donated "float" day (a voluntary no-watering day) is enabled. Preferably the homeowner not only specifies that he wishes to relinquish one allowed watering day, but also may be allowed to choose the particular day of the week to be relinquished. This is generally done in exchange for a credit from the local water authority on the homeowner's water bill. Thus, an advantage is provided to both the local water authority (reduction in water usage) and to the homeowner (reduction in water bill).

One problem occurs if the float day is enableable by the homeowner via a manual input device or the data input mode 70 (Block 14, Block 23, FIG. 14)—the local water authority cannot be assured that the remotely located FROG controller 10 in the individual's house has remained enabled. The homeowner could remove the float day activation, yet still receive the bill credit. To prevent this problem, the FROG controller 10 may be sold in two species, a float-day-enabled FROG controller 10 and a no-float FROG controller 10. The float-day-enabled FROG controller 10 may be homeowner configured either manually or by the data input mode 70. If configured manually, a user-option toggle is preferably included and is operable to manually or digitally allow the homeowner to change the day of the week of the float day, but not to manually remove the enabled float day. If the float-day enabled FROG controller 10 is to be configured by data input, the homeowner preferably configures or reconfigures his customized water budget/schedule 105 using the web-based wizard to change the day of the week, which the homeowner then inputs into his FROG controller 10 via the data input mode 70 (Block 14, Block 23, FIG. 14).

Removal of the float day (if, for example, the homeowner later changes his mind) could be implemented by sending a water authority service person to manually change the setting, but is preferably implemented without the use of water authority employee time. The float day can be removed by use of the data input mode 70, but cannot be re-enabled again by the data input mode 70B. The homeowner can access the web-based wizard to create a new customized water budget/schedule 105 removing the credit and the float day. A new SD card 79A can be mailed to the homeowner or picked up by the homeowner from the water authority. If the homeowner then inserts the new SD card 79A into the SD card slot 75A to update his FROG controller 10, the microcontroller program is instructed to remove the float day. If the homeowner fails to insert the new SD card 79A to update his FROG controller 10, he continues to donate the float day, but no longer receives the credit on his bill. However, the float day cannot be re-enabled through the data input mode 70, as the water authority cannot be assured the new SD card 79A has been inserted to update the FROG controller 10 and activate a float day, so cannot provide a water credit.

Preferably, however, the float day is enableable and dis-ableable by usage of the wireless input mode 150 (Block 15, Block 24, FIG. 14). Using the wireless input mode 150 would remove the need for two types of FROG controllers, as the water authority would be assured that the homeowner's customized water budget/schedule 105 (activating, changing, or removing the float day) was input wirelessly into the homeowner's FROG controller 10. The usage of the wireless input mode 150 would also allow multiple enabling and disabling of the float day on an individual's FROG controller 10.

Additionally, removal of the float day would be equally simple. The homeowner can access the web-based wizard to create a new customized water budget/schedule 105. The updated customized water budget/schedule 105 can be automatically transmitted wirelessly 150 to the homeowner's FROG controller. Upon removal of the voluntary no-watering float day, the homeowner would no longer receive a water credit.

From the foregoing, it will be apparent that the FROG smart controller 10 solves the problem of delivering adequate water for landscaping needs by utilizing the empirically-derived evapotranspiration local characteristic curve and local mandatory and voluntary watering restrictions, while incorporating a water need increase affected by the reduced number of mandated and voluntary no-watering days and a water need reduction affected by deeper, less frequent watering.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

We claim:

1. An add-on irrigation controller for controlling water control valves and for utilizing with an existing controller set with initial start times and initial run-time durations, comprising:
   a housing,
   a microcontroller housed within said housing and programmed with a microcontroller program operative to receive and transmit data and to determine said initial start times and said initial run-time durations from said existing controller;
   a data input system configured to allow data to be imported into said add-on irrigation controller; wherein said data input system comprises a data input receiver operable to receive evapotranspiration data and any regulation data; wherein said evapotranspiration data are obtained from an evapotranspiration local characteristic curve for at least one locality; wherein said any regulation data comprise local mandatory watering restrictions for said at least one locality; wherein said evapotranspiration data and said any regulation data are accessible to said microcontroller program; wherein said microcontroller program is configured to calculate a watering budget and watering schedule based on at least said evapotranspiration data, on said any regulation data, on said initial start times, on said initial run-time durations, and on a minute-based representation of a total water volume as delivered by said existing controller; wherein said representation of said total water volume is calculated by multiplying an initial number of watering days per period of time for a designated zone of said existing controller, by an initial number of watering events per day for said designated zone of said existing controller, and by a number of minutes per watering event for said designated zone of said existing controller; and wherein said representation of said total water volume is allocated to a number of watering days of said period of time;

wherein said microcontroller program is capable of utilizing said watering schedule to control said water control valves;

at least one non-volatile memory storage medium configured to receive and to store data from said microcontroller; and a real-time clock operatively connected to said microcontroller.

2. The add-on irrigation controller, as recited in claim 1, wherein said data input receiver comprises a data storage unit reader.

3. The add-on irrigation controller, as recited in claim 1, wherein:

said add-on irrigation controller is programmed to allow a user-selectable voluntary no-watering day restriction;

said any regulation data further comprise said voluntary no-watering day restriction; and said microcontroller program is functional to prohibit watering on said voluntary no-watering day on an ongoing basis, with a minimum of one watering day allowed per week.

4. The add-on irrigation controller, as recited in claim 1, wherein said data input receiver comprises a wireless receiver.

5. The add-on irrigation controller, as recited in claim 1, further comprising an environmental sensor configured to sense at least one environmental factor, wherein said microcontroller program further bases said watering schedule on said sensor data.

6. An add-on irrigation controller, for controlling water control valves and for utilizing with an existing controller set with initial start times and initial run-time durations, comprising:

a housing, a microcontroller housed within said housing and programmed with a microcontroller program operative to receive and transmit data and to determine said initial start times and said initial run-time durations from said existing controller;

a data input system configured to allow data to be imported into said add-on irrigation controller; wherein said data input system comprises a data input receiver operable to receive evapotranspiration data and any regulation data; wherein said evapotranspiration data are obtained from an evapotranspiration local characteristic curve for at least one locality; wherein said any regulation data comprise local mandatory watering restrictions for said at least one locality; wherein said evapotranspiration data and said any regulation data are accessible to said microcontroller program; and wherein said microcontroller program is configured to calculate a watering budget and watering schedule based on at least said evapotranspiration data, on said any regulation data, on said initial start times, and on said initial run-time durations; and wherein said microcontroller program is capable of utilizing said watering schedule to control said water control valves; wherein said data input system is configured to receive into said add-on irrigation controller a customized watering schedule calculated through use of a web-based irrigation customization software application accessible to a user through an Internet website, wherein said customized watering schedule is based on property-specific data input by the user, on said evapotranspiration data, on said any regulation data, on said initial start times, and on said initial run-time durations;

at least one non-volatile memory storage medium configured to receive and to store data from said microcontroller; and a real-time clock operatively connected to said microcontroller.

7. The add-on irrigation controller as recited in claim 6, wherein said data input receiver comprises a data storage unit reader, and wherein said data input system is configured to receive said customized watering schedule stored on a data storage unit.

8. The add-on irrigation controller as recited in claim 1, wherein said microcontroller program is further configured to automatically shift zone start times by creating said zone start times that differ from said initial start times.

9. An add-on irrigation controller for controlling water control valves for utilizing with an existing controller set with initial start times and initial run-time durations, comprising:

a housing, a microcontroller housed within said housing and programmed with a microcontroller program operative to receive and transmit data and to determine said initial start times and said initial run-time durations from said existing controller; wherein said microcontroller program is further configured with a learn-while-managing mode; wherein said microcontroller program disallows watering by said existing controller for a disallowance time period of at least twenty-four hours while determining said initial start times and said initial run-time durations from said existing controller during said at least twenty-four hours to create a temporary minutes of run time per run period per zone; wherein said microcontroller program calculates a temporary watering budget and schedule based on said temporary minutes of run time per run period per zone; wherein said temporary watering budget and schedule are used to control said valves for at least a second twenty-four hours after the end of said disallowance time period; and wherein said microcontroller program determines said initial start times and said initial run-time durations from said existing controller during said at least a second twenty-four hours;

a data input system configured to allow data to be imported into said add-on irrigation controller; wherein said data input system comprises a data input receiver operable to receive evapotranspiration data and any regulation data; wherein said evapotranspiration data are obtained from an evapotranspiration local characteristic curve for at least one locality; wherein said any regulation data comprise local mandatory watering restrictions for said at least one locality; wherein said evapotranspiration data and regulation data are accessible to said microcontroller program; and wherein said microcontroller program is configured to calculate a watering budget and watering schedule based on at least said evapotranspiration data, on said any regulation data, on said initial start times, and on said initial run-time durations; and wherein said microcontroller program is capable of utilizing said watering schedule to control said water control valves;

at least one non-volatile storage medium configured to receive and to store data from said microcontroller; and a real-time clock operatively connected to said microcontroller.

10. The add-on irrigation controller as recited in claim 1, wherein said add-on irrigation controller is configured to be transformed to a stand-alone converted controller upon the disconnecting of said existing irrigation controller.

11. The add-on irrigation controller as recited in claim 1, wherein said microprocessor program further includes a learn mode that is configured to determine an initial watering schedule pre-set by the user for the full summer maximum amount of water needed for said designated zone by sensing voltage changes, wherein said initial watering schedule comprises said initial number of watering days per a defined period of time for said designated zone of said existing controller, said initial number of said watering events per day for said designated zone of said existing controller, and said number of minutes per watering event for said designated zone of said existing controller, wherein said defined period of time is at least one day.

12. The add-on irrigation controller as recited in claim 11, wherein said defined period of time comprises one week.

13. The add-on irrigation controller as recited in claim 11, wherein said defined period of time comprises two weeks.

14. The add-on irrigation controller as recited in claim 1, wherein said watering budget is calculated for a particular time period by determining the current day and multiplying an evapotranspiration factor, from said evapotranspiration local characteristic curve, associated with said current day or multiplying an average of evapotranspiration factors, from said evapotranspiration local characteristic curve, associated with a small range of days including said current day by said representation of said total water volume for said particular time period.

15. The add-on irrigation controller as recited in claim 14, wherein said watering schedule for said particular time period is calculated by dividing said watering budget for said particular time period by said number of said watering days allowed per said particular time period and by said initial number of watering events per day for said designated zone.

16. The add-on irrigation controller as recited in claim 14, wherein said watering budget for said particular time period is multiplied by a watering depth factor to reduce said watering budget, wherein said watering depth factor is based on a reduction in water need due to increased depth of watering.

17. The add-on irrigation controller as recited in claim 1, wherein said data input receiver comprises a wireless transceiver configured to receive and transmit data.

18. The add-on irrigation controller, as recited in claim 6, wherein said data input receiver comprises a wireless receiver.

19. The add-on irrigation controller, as recited in claim 6, wherein:
said add-on irrigation controller is programmed to allow a user-selectable voluntary no-watering day restriction;
said any regulation data further comprise said voluntary no-watering day restriction; and
said microcontroller program is functional to prohibit watering on said voluntary no-watering day on an ongoing basis, with a minimum of one watering day allowed per week.

20. The add-on irrigation controller, as recited in claim 6, further comprising an environmental sensor configured to sense at least one environmental factor, wherein said microcontroller program further bases said watering schedule on said sensor data.

21. The add-on irrigation controller, as recited in claim 6, wherein said microcontroller program is further configured to automatically shift zone start times by creating said zone start times that differ from said initial start times.

22. The add-on irrigation controller as recited in claim 6, wherein said add-on irrigation controller is configured to be transformed to a stand-alone converted controller upon the disconnecting of said existing irrigation controller.

23. The add-on irrigation controller as recited in claim 6, wherein said data input receiver comprises a wireless transceiver configured to receive and transmit data.

24. The add-on irrigation controller as recited in claim 6, wherein said customized watering schedule is further based on a watering depth factor providing a reduction in water need due to increased depth of watering.

25. The add-on irrigation controller, as recited in claim 9, wherein said data input receiver comprises a data storage unit reader.

26. The add-on irrigation controller as recited in claim 9, wherein said data input receiver comprises a wireless receiver.

27. The add-on irrigation controller as recited in claim 9, further comprising an environmental sensor configured to sense at least one environmental factor, wherein said microcontroller program further bases said watering schedule on said sensor data.

28. The add-on irrigation controller as recited in claim 9, wherein said data input receiver comprises a wireless transceiver configured to receive and transmit data.

29. The add-on irrigation controller as recited in claim 9, wherein said microcontroller program is further configured to automatically shift zone start times by creating said zone start times that differ from said initial start times.

30. The add-on irrigation controller as recited in claim 9, wherein said add-on irrigation controller is configured to be transformed to a stand-alone converted controller upon the disconnecting of said existing irrigation controller.

* * * * *